US010176815B1

(12) United States Patent
Chmiel et al.

(10) Patent No.: US 10,176,815 B1
(45) Date of Patent: Jan. 8, 2019

(54) SYSTEM FOR ACOUSTIC COMMUNICATION

(71) Applicant: AMAZON TECHNOLOGIES, INC., Seattle, WA (US)

(72) Inventors: Krystian Jozef Chmiel, Sunnyvale, CA (US); David George Butler, San Jose, CA (US); Richard William Mincher, Cupertino, CA (US); Andrew David Price, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 153 days.

(21) Appl. No.: 14/541,955

(22) Filed: Nov. 14, 2014

(51) Int. Cl.
G06F 17/00 (2006.01)
G10L 19/012 (2013.01)
H04R 1/08 (2006.01)
G10L 19/16 (2013.01)

(52) U.S. Cl.
CPC .......... *G10L 19/012* (2013.01); *G10L 19/167* (2013.01); *H04R 1/08* (2013.01)

(58) Field of Classification Search
CPC ... G10L 19/012; G10L 19/167; G10L 19/018; H04R 1/08; H04H 60/58; G06F 3/16; G06F 3/165; G06F 3/167; H04L 67/06; H04B 11/00; H04B 14/002; H04B 14/004; G11B 20/00086
See application file for complete search history.

(56) References Cited

U.S. PATENT DOCUMENTS

| 8,510,848 | B1 | 8/2013 | Zhao et al. | |
| 8,725,838 | B2 | 5/2014 | Bezos | |
| 9,264,823 | B2 | 2/2016 | Bajic et al. | |
| 2006/0080094 | A1* | 4/2006 | Katayama | G10L 21/0364 704/229 |
| 2006/0136544 | A1* | 6/2006 | Atsmon | A63H 3/28 709/200 |
| 2007/0129036 | A1* | 6/2007 | Arora | G10L 21/038 455/205 |
| 2009/0075649 | A1 | 3/2009 | Rolf | |
| 2009/0323986 | A1 | 12/2009 | Lu et al. | |

(Continued)

OTHER PUBLICATIONS

Negron, Daniell L., "Non-final Office Action dated Jul. 21, 2016", U.S. Appl. No. 14/542,068, The United States Patent and Trademark Office, Jul. 21, 2016.

(Continued)

*Primary Examiner* — Fan Tsang
*Assistant Examiner* — David Siegel
(74) *Attorney, Agent, or Firm* — Lindauer Law, PLLC

(57) ABSTRACT

Described are techniques for determining whether a received audio signal is corrupted or a product of noise, prior to decoding the entire signal. A received audio signal may include both initialization data and encoded payload data. Correspondence between the initialization data and confirmation data may be determined. If the correspondence indicates a match, the audio receiver may continue decoding the audio signal to access the payload data. If the correspondence does not indicate a match, the audio receiver may cease decoding, which may conserve power, computing resources, and time, ensuring that subsequent audio signals are not missed while the audio receiver decodes a false or corrupted signal.

20 Claims, 8 Drawing Sheets

(56) References Cited

U.S. PATENT DOCUMENTS

2013/0096926 A1* 4/2013 Maling, III .......... H04L 12/282
704/500

OTHER PUBLICATIONS

Negron, Daniell L.,"Final Office Action dated Jan. 10, 2017", U.S. Appl. No. 14/542,068, The United States Patent and Trademark Office, Jan. 10, 2017.

Negron, Daniell L., "Notice of Allowance dated Oct. 6, 2017", U.S. Appl. No. 14/542,068, The United States Patent and Trademark Office, Oct. 6, 2017.

Hanes, et al., "Fax, Modem, and Text for IP Telephony", Hanes, David and Salgueiro, Gonzalo, "Fax, Modem, and Text for IP Telephony", Cisco Press, Cisco Systems, Inc., Jun. 2008, 14 pages.

Negron, Daniell L., "Non-Final Office Action dated May 16, 2017", U.S. Appl. No. 14/542,068, The United States Patent and Trademark Office, May 16, 2017.

Cao, Allen T., "Non-final Office Action dated Aug. 2, 2018", U.S. Appl. No. 14/542,068, The United States Patent and Trademark Office, Aug. 2018.

\* cited by examiner

SYSTEM FOR ACOUSTIC COMMUNICATION

BACKGROUND

Audio signals may be used to communicate information between two or more devices. For example, audio signals may be used to provide data to multiple devices within range of the audio signal. Audio signals may also be used as an alternative to other means of wireless communication. However, noise may interfere with the transmission of the audio signals by preventing accurate recognition, receipt, or decoding of the audio signals.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
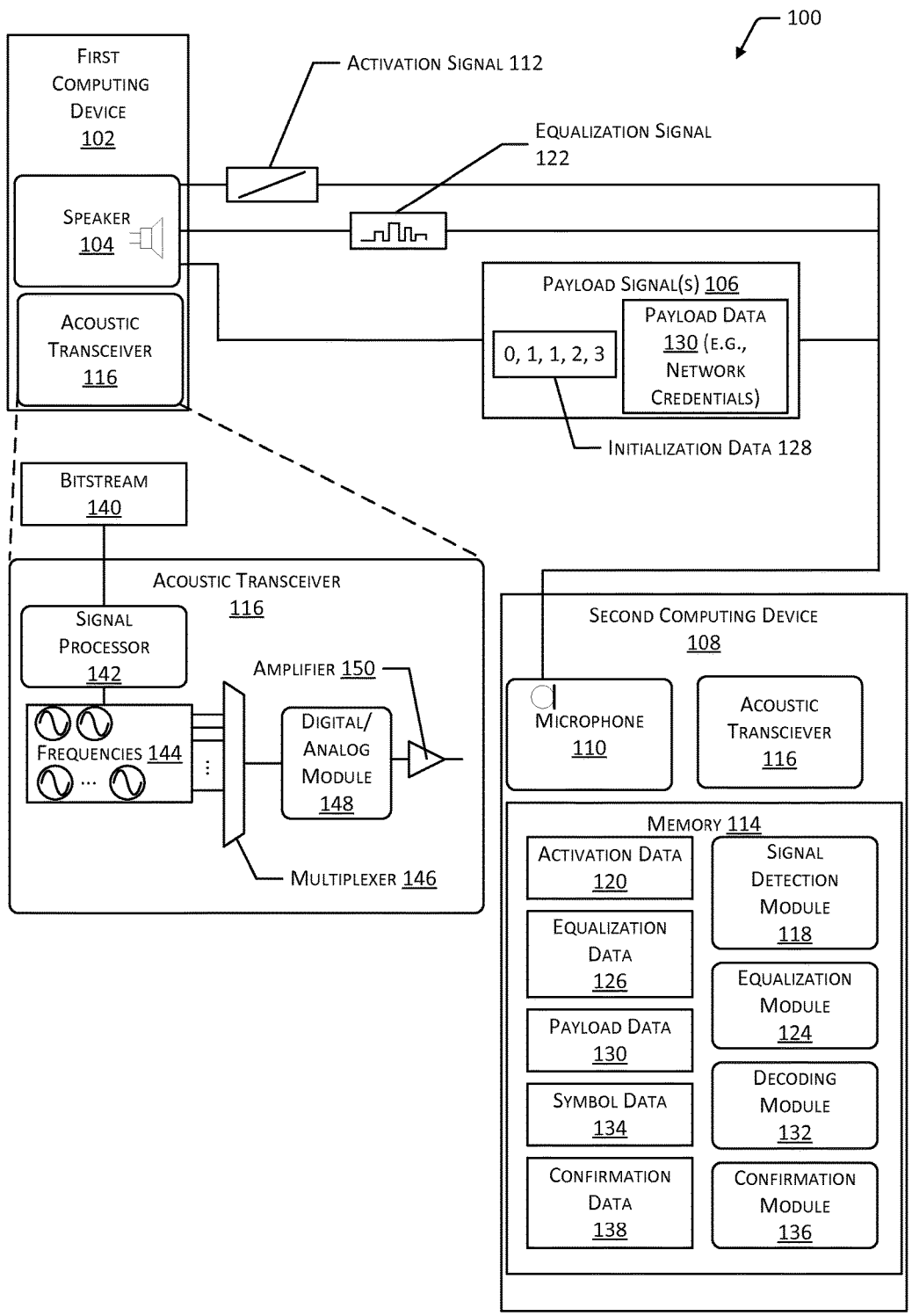
FIG. 1 depicts a system for receiving emitted audio signals and confirming the accurate receipt thereof.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Data may be transmitted acoustically between devices using audio signals and may be encoded in a passband signal as one or more symbols. For example, the symbols may comprise a modulated sine wave of one or more tones. Encoded data may be represented by a sequence of symbols that may be decoded by a receiving device to access the encoded data. Compared to electromagnetic signals, audio signals generally provide less bandwidth for data communication and have longer transmission times. For example, transmission of a data packet via an audio signal may require one second or longer, while networks using electromagnetic signals, such as a local area network (LAN) or wide area network (WAN) may transmit a data packet in nanoseconds or microseconds.

Audio signals may experience interference from noise in the ambient environment. In some situations, noise may be detected and decoded by an audio receiver as a false signal. In other situations, noise may obscure and render an audio signal undetectable or may corrupt or otherwise interfere with the data transmission. Decoding of flawed audio signals (e.g., false or corrupted audio signals) may consume resources on the receiving device, such as by consuming battery power, using processor resources, and so forth. Additionally, during the time that a receiving device is decoding a flawed audio signal, which may require a significant length of time on the order of one second or more, the receiving device may be unable to detect a subsequent activation signal or decode other audio signals.

Despite the drawbacks of communicating data via audio signals, an audio signal advantageously enables, among other things, communication between devices that may otherwise lack the ability to communicate via other means due to equipment limitations. For example, communication via audio signals may be used by devices unable to switch between or discover other modes of communication, such as Wi-Fi or other methods of wireless communication. Other example equipment limitations may include hardware or software that is unable to communicate via electromagnetic signals, equipment that lacks the ability to switch between wireless access points seamlessly, and so forth.

This disclosure describes techniques that may be used to determine when an audio receiving device has begun to decode a false audio signal, such as noise, or when the audio receiving device is attempting to decode an audio signal corrupted by noise or limitations in hardware or software. An audio receiving device may include a receiver, such as a microphone, and may be in communication with one or more hardware processors (processors) and one or more computer-readable storage media (CRSM). The audio receiving device may be configured to detect an activation signal, which may include an audio signal provided at one or more frequencies at a predetermined intensity. Responsive to detection of the activation signal, one or more features of the audio receiving device may be activated. For example, an expected activation signal may be determined using activation data stored in a CRSM. The activation data may be accessed by the processor(s) and may include a range of frequencies as well as a threshold intensity corresponding to an expected activation signal. In some implementations, activation data may include a waveform to which a received activation signal is compared to determine correspondence between the waveform and the activation signal. While attempting to detect an activation signal, other features of the audio receiving device, such as decoding equipment or processes, may be inactive to conserve power and computing resources.

When an audio signal having an intensity or frequencies that correspond to the threshold intensity or range of frequencies of the activation data is detected, the device may begin decoding audio data. In one implementation, the activation signal may include a chirp activation signal that transitions from a first frequency to a second frequency over a period of time. Chirp signals may include easily detected, auto-correlating signals and may be produced using little power or computing resources. For example, the activation signal may include a relatively short chirp signal, such as a signal having a duration of 5 milliseconds (ms) or less. To reduce the effects of ambient noise and reduce audibility of the audio signals by humans, the activation signal may be provided at an ultrasonic frequency, such as at 18,000 hertz (Hz) or greater. For example, the activation signal may include a chirp signal having a duration of 4.1 ms that linearly increases from an initial frequency of 18,375 Hz to a frequency of 19,355 Hz.

Subsequent to receipt of the activation signal, a payload signal, which may include an audio signal that includes encoded payload data (e.g., data that relates to the fundamental purpose of the transmission) may be received. In some instances, the activation signal received by the audio receiving device may have been a product of noise. In other instances, the activation signal may have been properly received, but subsequent audio signals may be corrupted due to noise or equipment limitations. To reduce the effect of ambient noise or equipment limitations, the payload signal may include initialization data preceding the payload data. The initialization data may be configured to identify the payload signal as an intentional and uncorrupted audio signal (as contrasted to noise or a corrupted signal) and to confirm receipt of the payload signal.

After receipt of the activation signal, the audio receiving device may begin decoding subsequent audio signals, which may include the initialization data of the payload signal. Decoding of the initialization data may yield data that corresponds to a sequence of symbols. The sequence of symbols may be selected to include a sequence unlikely to be found in ambient noise. This determined sequence of symbols may be compared to confirmation data, which corresponds to an expected sequence of symbols. The confirmation data may be used to verify that the received audio signal is not a product of noise. The confirmation data may also be used to verify that the received audio signal is not affected by noise or equipment limitations. When correspondence between the confirmation data and the received initialization data indicates a match, the audio signal may be identified as a payload signal. The audio receiving device may continue decoding the payload signal, thereby accessing the payload data. To confirm receipt and decoding of the payload data, one or more error handling schemes may be used. For example, one or more error detection or correction schemes, such as a cyclic redundancy check (CRC), may be used to verify proper receipt of the payload data. A determination of correspondence between the error detection or correction scheme and an expected result may verify the integrity of the payload data.

When correspondence between the confirmation data and the received initialization data indicates a mismatch, the receiving device may cease decoding the audio signal. A mismatch may occur either due to the received activation signal being a product of noise, in which case the initialization data would not follow the false activation signal. A mismatch may also occur due to noise or equipment limitations corrupting the initialization data or rendering it undetectable. The prompt cessation of decoding, upon determination that the expected sequence of symbols was not received, may prevent consumption of power and computing resources caused by the decoding of noise or of data corrupted by noise. The prompt cessation of decoding may also prevent the failure to detect or decode a subsequent audio signal during the time that the receiving device is decoding a flawed audio signal. In some implementations, the initialization data may be relatively short in duration, such as 30 ms or less. For example, the initialization data may include a sequence of five symbols, each having a duration of 4.1 ms. In other implementations, the duration of each symbol may range from about 1.36 ms to about 20.4 ms, such that initialization data that includes a sequence of five symbols would have a duration ranging from about 6.8 ms to about 102 ms. For example, to account for differences in manufacture, drift during operation, and so forth, a tolerance of 10% may be applied to the endpoints of the range. Use of symbols having a duration of at least 1.36 ms may accommodate response times of an audio emitting device. For example, a duration of 1.36 ms may be longer than the response time of a speaker, such that the limitations of the speaker do not prevent emission of the symbol. Use of symbols having a duration of 20.4 ms or less may reduce interference from the ambient environment. For example, a symbol having a duration greater than 20.4 ms may interfere with itself when emitted proximate to walls or other obstacles that may reflect the symbol. In some implementations, the duration of one or more symbols may be less than 1.36 ms or greater than 20.4 ms due to environmental or electronic factors, circuit drift, and so forth. For example, ambient temperatures may increase the response time of a speaker to 1.5 ms, such that the minimum duration of a symbol would be 1.5 ms.

In some implementations, one or more equalization symbols, corresponding to the symbols used to encode one or more of the confirmation data, the payload data, or the initialization data, may be received by the audio receiving device prior to beginning decoding of the payload signal. The equalization symbols may include one or more of the symbols used to encode the one or more of the confirmation data, the payload data, or the initialization data. In other implementations, the equalization symbols may include one or more symbols having frequencies identical or within a threshold tolerance of the frequencies of the symbols used to encode the one or more of the confirmation data, the payload data, or the initialization data. The equalization symbols may be emitted by an audio emitting device to verify that the audio receiving device or the audio emitting device is able to receive or produce, respectively, one or more of the symbols that may be used to encode the payload data. An intensity corresponding to one or more of the equalization symbols or associated frequencies may be determined using an audio receiver or software associated with the audio receiving device. Correspondence between the determined intensity and a threshold intensity, which may be stored as equalization data, may be identified, such as by using software associated with the audio receiving device. When correspondence between the determined intensity and the threshold intensity indicates a mismatch, the audio receiving device may cease decoding audio signals. For example, a failure to receive one or more of the equalization symbols or corresponding frequencies by the audio receiving device, at a threshold intensity, may indicate that current ambient noise or equipment limitations may render the decoding of an audio signal to be impossible. In other implementations, upon failure of one or more of the equalization symbols to be received at a threshold intensity, the equalization symbols may be resent. In still other implementations, a variance between the intensity of one or more portions of the received equalization symbols and the corresponding threshold intensity may be determined. The manner in which subsequent audio signals are received may be modified based on the variance such that the subsequent signals are received at the threshold intensity or greater.

In some implementations, one or more of the activation signal or the initialization data may include the equalization symbols or frequencies corresponding to the symbols used to encode the payload data. For example, the intensity of one or more portions of a chirp signal or other type of activation signal at one or more frequencies that encode the payload data may be identified. Correspondence between the intensity of the one or more portions of the activation signal and a threshold intensity of the equalization data may be determined. In other implementations, the initialization data may include one or more of the equalization symbols. For example, the intensity of at least a portion of the sequence of symbols determined from the initialization data may be identified. Correspondence between the determined intensity and the threshold intensity of the equalization data may be determined, such as by using software associated with the audio receiving device. In still other implementations, the activation signal, the initialization data, and the equalization symbols may each be a part of the same signal. For example, a sequence of symbols may be provided at an intensity and across a range of frequencies that correspond to the activation data. The intensity of at least a portion of the sequence of symbols may be used to determine correspondence with a threshold intensity of the equalization data. Correspondence between the sequence of symbols and an expected sequence of symbols stored as confirmation data may also be determined, such as by using software associated with the audio receiving device.

In some implementations, one or more of the activation signal, the initialization data, or the equalization symbols may be used to determine variations in signal intensity caused by noise or equipment limitations. For example, the intensity of the activation signal, initialization data, or equalization symbols at one or more frequencies may be identified by an audio receiver or software associated with the audio receiving device. Correspondence between the identified intensity and a threshold intensity may be determined, such as by comparing the received signal(s) to stored data that includes the threshold intensity. If the intensity varies from the threshold intensity at one or more frequencies by more than a predetermined amount, this variance may be caused by noise or equipment limitations. The variance between the identified intensity and the threshold intensity may be determined by one or more of an audio emitting device or an audio receiving device. Emission of a payload signal encoding the payload data may be modified based on the variance. For example, if the intensity is too high or too low at a given frequency for successful decoding to occur, the payload signal may be emitted with a lower or higher intensity. In other implementations, the sensitivity of an audio receiving device for the given frequency may be modified to compensate for the variance.

Implementations described herein may reduce or eliminate the effects of noise or equipment limitations when communicating data using audio signals. Implementations described herein may cease decoding upon determining the audio receiving device is decoding a flawed audio signal, thus conserving power and computing resources as well as reducing the likelihood of a failure of the audio receiving device to receive a subsequent audio signal.

FIG. 1 depicts a system 100 for receiving audio signals and confirming the validity, proper receipt, and decoding thereof. A first computing device 102 may include a speaker 104 or another type of audio emitting device for emitting one or more payload signals 106. The payload signal(s) 106 may be received and processed by a second computing device 108, which may include a microphone 110 or other type of audio receiving device. The first computing device 102 and second computing device 108 may include mobile devices, smartphones, set-top boxes, tablet computers, personal computers, wearable computers, or other types of computing devices. In some implementations, one or more of the first computing device 102 or second computing device 108 may be in remote communication with components for generating or processing the payload signals 106. For example, the first computing device 102 or second computing device 108 may be in networked communication with one or more processors, CRSM, or other computing devices. Networked communication may be established using any type of wired or wireless network, including, but not limited to, a personal area network (PAN), local area network (LAN), wide area network (WAN), and so forth. Network(s) may communicate using Ethernet, Wi-Fi™, Bluetooth®, ZigBee®, 3G, 4G, LIE, Z-Wave, or other technologies.

In some implementations, one or more components of the second computing device 108 may remain inactive to conserve power and computing resources until an activation signal 112 is received from the first computing device 102. For example, an activation signal 112 may not necessarily be decoded by the second computing device 108 but may simply be received or detected to cause activation of other components of the second computing device 108, such as hardware or software for processing or decoding audio signals. FIG. 1 depicts the speaker 104 emitting an activation signal 112, which may be received by one or more microphones 110 or other audio receiving devices within range thereof. In some implementations, the activation signal 112 may include a chirp activation signal that transitions from a first frequency to a second frequency. A chirp activation signal may be an auto-correlating signal that is readily detectable by the microphone 110 in a short time, such as within 5 ms. As such, a chirp activation signal may be produced using little power or computing resources, while being reliably detected by one or more microphones 110 or other receiving devices within range of the activation signal 112. In one implementation, the activation signal 112 may include a chirp activation signal having a duration of 4.1 ms that linearly increases from an initial frequency of 18,375 Hz to a frequency of 19,355 Hz.

A memory 114 associated with the second computing device 108 may store an acoustic transceiver 116, which may be used to process the payload signals 106 or other audio signals. While an acoustic transceiver 116 is depicted, in some implementations an acoustic transmitter or receiver may instead be used to provide unidirectional communication. For example, the second computing device 108 may include an acoustic receiver, or both an acoustic receiver and an acoustic transmitter. Likewise, the first computing device 102 may similarly have an acoustic transceiver 116 associated therewith, which may be used to generate and emit the payload signals 106. The acoustic transceiver 116 of the first computing device 102 may include an acoustic transmitter, or both an acoustic transmitter and an acoustic receiver. The memory 114 may include any manner of CRSM, data store, or other type of memory, in direct or networked communication with the first computing device 102 or the second computing device 108. For example, a CRSM may include one or more of an electronic storage medium, a magnetic storage medium, an optical storage medium, a quantum storage medium, a mechanical computer storage medium, and so forth.

The memory 114 may store a signal detection module 118. The signal detection module 118 may access activation data 120 in the memory 114. Upon receipt of the activation signal 112, the signal detection module 118 may determine correspondence between one or more parameters of the activation signal 112 and parameters of the activation data 120. For example, the activation signal 112 may be emitted using a selected range of frequencies in a selected order, have a selected intensity at one or more of the frequencies, have a selected duration, and so forth. The intensity may comprise data indicative of amplitude of the signal or a portion thereof. For example, intensity may be measured as Decibel-milliwatts (dBm) or as a voltage at a receiver. In some implementations, the intensity may be expressed as a power spectrum. The activation data 120 may include one or more frequencies, a threshold intensity or range of threshold intensities, a duration or range of durations, and so forth. If the signal detection module 118 determines correspondence between the activation data 120 and the activation signal 112, the second computing device 108 may begin decoding one or more subsequent payload signals 106 responsive to this determination. If the one or more of the intensity, frequencies, or duration of the activation signal 112 does not correspond to the activation data 120, decoding components of the second computing device 108 may remain inactive, and the microphone 110 may continue attempting to detect subsequent activation signals 112.

In some implementations, the second computing device 108 may include an audio emitter or other components that may be used to communicate with the first computing device 102 by emitting audio signals for receipt by the first computing device 102. For example, the second computing device 108 may provide a confirmation signal indicating that the activation signal 112 was received, responsive to which the first computing device 102 may provide subsequent signals. In other implementations, the first computing device 102 may provide signals in the absence of any response from one or more second computing devices 108. For example, the speaker 104 may periodically emit one or more of an activation signal 112 or a payload signal 106 for receipt by any microphones 110 within range thereof.

FIG. 1 further depicts the first computing device 102 emitting an equalization signal 122, which may be received by the microphone 110 of the second computing device 108. An equalization signal 122 may include one or more equalization symbols that may be used to determine whether any hardware or software limitations of one or more of the first computing device 102 or the second computing device 108 may affect emission or receipt of payload signals 106. The equalization signal 122 may also be used to determine whether a current level of ambient noise may hinder or prevent receipt and decoding of payload signals 106. In some implementations, the equalization signal 122 may not necessarily be decoded by the second computing device 108 but may simply be received and processed to determine whether each equalization symbol of the equalization signal 122 may be successfully received by the microphone 110. In some implementations, an audio emitting device may access activation data 120 for use generating an activation signal 112 for emission.

An equalization module 124 stored in association with the second computing device 108 may receive and process the equalization signal 122. In some implementations, the equalization module 124 may access equalization data 126 in the memory 114 to determine correspondence between the equalization signal 122 and the equalization data 126. For example, the equalization data 126 may include one or more equalization symbols and a threshold intensity for each of the equalization symbols. Correspondence may be determined between the equalization data 126 and the equalization signal 122 if the intensity for one or more equalization symbols is equal to or exceeds the corresponding threshold intensity in the equalization data 126. For example, the equalization signal 122 may include at least one instance of each symbol used to encode data within an emitted payload signal 106. Continuing the example, the equalization signal 122 may include four symbols, such as "0, 1, 2, 3." If it is determined by the first computing device 102 that one or more of the symbols may not be successfully emitted with sufficient intensity for receipt by the second computing device 108, the first computing device 102 may cease emitting audio signals.

In another example, the speaker 104 or other hardware or software associated with the first computing device 102 may be damaged or incapable of emitting subsequent payload signals 106 at frequencies and intensities suitable for receipt and decoding by the second computing device 108. In such a situation, the first computing device 102 may cease attempting to emit audio signals to conserve power and computing resources. In some implementations, the first computing device 102 may retry emitting the equalization signal 122 at a later time. For example, if a current level of ambient noise hinders emission of the equalization signal 122, the first computing device 102 may periodically attempt to resend the equalization signal 122 to determine whether a level of ambient noise has changed in a manner that may permit receipt and decoding, by the second computing device 108, of payload signals 106.

If it is determined by the second computing device 108 that one or more of the equalization symbols may not be successfully received or decoded by the second computing device 108, the second computing device 108 may cease decoding audio signals. For example, the intensity of one or more of the received equalization symbols may be less than an expected threshold intensity or one or more expected equalization symbols may not be received by an audio receiving device. Prompt cessation of the decoding process may conserve power and computing resources of the second computing device 108. Further, cessation of the decoding process may prevent the second computing device 108 from consuming time decoding flawed audio signals, which may cause the second computing device 108 to fail to detect subsequent signals. In some implementations, the second computing device 108 may cease detecting additional signals from the first computing device 102. For example, if the microphone 110 or other hardware or software associated with the second computing device 108 is damaged or incapable of receiving or decoding received payload signals 106, the second computing device 108 may cease attempting to receive signals to conserve power and computing resources.

In other implementations, the equalization module 124 may determine a variance between the intensity of one or more equalization symbols in the equalization signal 122 and the threshold intensity of the equalization data 126. One or more of the first computing device 102 or second computing device 108 may modify the intensity or manner in which the one or more equalization symbols or frequencies corresponding to the equalization symbols are emitted or received responsive to the variance. For example, if it is determined that one of the four depicted equalization symbols is emitted with an intensity less than an expected or threshold intensity, the first computing device 102 may modify the emission of subsequent payload signals 106 to enhance the intensity of the particular symbol. In other implementations the second computing device 108 may modify a sensitivity thereof to receive the particular symbol at an enhanced intensity. In some implementations, the activation signal 112 may be used for a similar purpose. For example, it may be determined that one or more frequencies emitted in the activation signal 112 have an intensity less than an expected or threshold intensity. The first computing device 102 may modify the subsequent emission of audio signals to enhance the intensity of the one or more frequencies, or the second computing device 108 may modify a sensitivity thereof to receive the one or more frequencies at an enhanced intensity.

In some implementations, the second computing device 108 may provide a confirmation signal to the first computing device 102 indicating that the equalization signal 122 was received or that correspondence between the equalization signal 122 and the equalization data 126 was determined. In other implementations, the first computing device 102 may provide payload signals 106 in the absence of any response from one or more second computing devices 108.

FIG. 1 depicts the speaker 104 emitting one or more payload signals 106, which may be received by the microphone 110 of the second computing device 108. The payload signal(s) 106 may include both an initialization data 128, for determining that the payload signal(s) 106 are not corrupted or a product of noise, and payload data 130. The initialization data 128 may also be used to confirm successful receipt of the payload signal 106 by the second computing device 108. The payload data 130 may include the portion of the data provided by the first computing device 102 that relates to the fundamental purpose of the transmission (e.g., the cargo, actual, or body data). In some implementations, the payload data 130 may include network credentials. For example, the network credentials may comprise information to configure a wireless network connection such as SSID, password, digital certificate, and so forth. The network credentials may be used to configure the receiving device. Both the initialization data 128 and the payload data 130 may be encoded using sequences of symbols. FIG. 1 depicts the initialization data 128 including a sequence of five symbols: "0, 1, 1, 2, 3." In some implementations, the sequence of symbols in the initialization data 128 may be selected to appear in a non-random sequence in order to reduce the likelihood that noise emulating the sequence of symbols may be received by the second computing device 108. The payload data 130 may include any number or combination of symbols in any order suitable to encode and provide the payload data 130 to one or more second computing devices 108.

The depicted payload signal 106 may represent a single data packet or multiple data packets. In some implementations, initialization data 128 may precede the payload data 130 within each packet of a transmission, such that receipt of each data packet may be verified by decoding the corresponding initialization data 128. In other implementations, the initialization data 128 may precede multiple packets of payload data 130, such that decoding of the initialization data 128 a single time may be used to verify receipt of multiple packets of payload data 130.

As described previously, the payload data 130 may be preceded by the initialization data 128. The payload signal 106 may be preceded by an equalization signal 122, which may be preceded by an activation signal 112. In one implementation, the activation signal 112 may include a chirp activation signal 112 that linearly increases in frequency from 18,375 Hz to 19,355 Hz over a duration of 4.1 ms (equal to 180 samples at a sampling frequency of 44,100 Hz). The activation signal 112 may be followed by an equalization signal 122 that includes four symbols (e.g., "0, 1, 2, 3"). The equalization signal 122 may be followed by the payload signal 106, which may include initialization data 128 that includes five symbols (e.g., "0, 1, 1, 2, 3"), preceding the payload data 130. The payload data 130 may include a length field, which in one implementation, may have a length of eight bits. The length field may be followed by an error detection or correction scheme, such as a CRC, which in one implementation, may have a length of 16 bits. The CRC may be followed by a registration token, a set service identifier (SSID), and a key. The body portion of the payload data 130 (e.g., relating to the fundamental purpose of the transmission) may follow the CRC, registration token, SSID, and key.

A decoding module 132 in the memory 114 associated with the second computing device 108 may be used to decode the symbols in the initialization data 128. For example, symbol data 134 may include an encoding scheme associated with the symbols used to encode the data carried by the payload signal(s) 106. Symbol data 134 may include an identifier for multiple symbols, such as 0, 1, 2, and 3, and one or more frequencies corresponding to each symbol. In some implementations, symbol data 134 may include other symbol characteristics, such as a duration of one or more of the symbols. For example, one or more symbols may be associated with frequencies over a selected range, such as an ultrasonic range of 18,000 Hz or more. In some implementations, the frequencies of the plurality of symbols may range from 18,000 Hz to 20,000 Hz. For example, the largest common sampling frequency for many speakers 104 is 44,100 Hz. Due to the Nyquist rate, the maximum frequency able to be sampled would be 22,050 Hz. Limitations on the frequency response of speakers 104 or microphones 110 may further limit the maximum frequency able to be sampled to approximately 20,000 Hz. In one specific implementation, four symbols may be used, each having a duration of 4.1 ms (equal to a length of 180 samples at a sampling frequency of 44,100 Hz). In other implementations, the symbols may have a duration ranging from 1.36 ms (equal to 60 samples at a sampling frequency of 44,100 Hz) to 20.4 ms (equal to 900 samples at a sampling frequency of 44,100 Hz.) The symbols may be spaced evenly at frequencies ranging from 18,130 Hz to 19,600 Hz, which may accommodate a bit rate associated with the symbols and allow for the symbols to be spaced in a manner that maintains the symbols in a continuous phase. For example, each symbol may have a frequency of 490 Hz greater or less than each adjacent symbol. A first symbol may include a tone having a frequency of 18,130 Hz. A second symbol may include a tone having a frequency of 18,620 Hz. A third symbol may include a tone having a frequency of 19,110 Hz. A fourth symbol may include a tone having a frequency of 19,600 Hz.

The sampling frequency used by the speaker 104 or microphone 110 may be a multiple of a symbol rate (e.g., modulation rate, baud rate, and so forth), which may include the number of symbols provided per unit time. As described previously, a sampling frequency of 44,100 Hz may be used with the four symbols. Use of a sampling frequency that is a multiple of the symbol rate may accommodate bit rate and bandwidth constraints by facilitating generation of continuous phase signals. Use of continuous phase signals may facilitate control of the bandwidth of the symbols without windowing of the symbols. For example, windowing may involve limiting (e.g., setting to zero) a value that falls outside of a predetermined interval. To maintain this relationship between the symbol rate and the sampling frequency, use of a higher or lower sampling frequency may be accompanied by use of a greater or lesser frequency difference between each adjacent symbol, respectively. In the example above, spacing of symbols by a frequency of 490 Hz may reduce inter-symbol interference. The spacing of symbols combined with the length thereof may facilitate reliable decoding of the symbols. Additionally, spacing of the symbols by 490 Hz may facilitate maintaining the symbols in continuous phase to limit distortions, such as audible pops, during the emission thereof.

A confirmation module 136 may access confirmation data 138 in the memory 114 to determine correspondence between data decoded from the initialization data 128 and the confirmation data 138. For example, the confirmation data 138 may include data corresponding to an expected sequence of symbols present in the initialization data 128. If the second computing device 108 successfully receives and decodes the initialization data 128, correspondence between the initialization data 128 and the confirmation data 138 may be determined by the confirmation module 136. Responsive to this determination, the decoding module 132 may decode the portion of the payload signal 106 that includes the encoded payload data 130.

In some situations, the microphone 110 of the second computing device 108 may receive a false activation signal 112 (e.g., noise), or noise or equipment limitations may prevent successful receipt and decoding of the initialization data 128. In such situations, the confirmation module 136 may not determine correspondence between the initialization data 128 and the confirmation data 138. Responsive to a lack of confirmation, the decoding module 132 may cease decoding the payload signal 106 or other audio signals. Prompt cessation of the decoding process may conserve power and computing resources that would otherwise be expended attempting to decode a false signal or a payload signal 106 that is corrupted due to noise or equipment limitations. For example, due to the fact that a data packet communicated using payload signals 106 may have a significant duration, such as one or more seconds, without prompt cessation of the decoding process, a significant amount of time may be expended decoding improper data. During the time that the second computing device 108 is decoding the improper data, other activation signals 112, equalization signals 122, or payload signals 106 emitted by the first computing device 102 may not be received by the second computing device 108. As such, prompt cessation of the decoding process prepares the second computing device 108 to receive a subsequent signal.

One or more of the speaker 104 or the microphone 110 may utilize an acoustic transceiver 116 to send or receive data. In one implementation, the acoustic transceivers 116 may use multiple frequency shift keying (M-FSK) modulation to send information. In other implementations, other modulation schemes may be used. M-FSK or similar schemes may offer advantages by minimizing distortion resulting from ringing, warm up times, and so forth. For example, speakers 104 and microphones 110 may be subject to ringing and warm-up times, which may contribute to phase distortion. Further, some speakers 104 are driven by non-linear class D amplifiers. While offering several advantages, such as power efficiency, class D amplifiers may introduce distortion that may corrupt data. Additionally, locations where the first computing device 102 or second computing device 108 are used may experience multipath propagation, where the same signal travels along different routes to reach the receiver. Multipath propagation may distort the signals further, resulting in data corruption. Use of M-FSK techniques by the acoustic transceiver 116 may reduce or eliminate the negative effects of the ambient environment or equipment used to emit and receive payload signals 106.

The acoustic transceiver 116 of the first computing device 102 is shown receiving data from a bitstream 140 for transmission to the second computing device 108 via the payload signal 106. For example, the bitstream 140 may comprise data to be transmitted to the second computing device 108, such as network credentials, passwords, digital certificates, configuration data, and so forth. The bitstream 140 may be processed by a signal processing module 142. The signal processing module 142 may be configured to generate data indicative of output at one or more frequencies 146 that encode the data represented by the bitstream 140. One or more inputs of a multiplexer 146 may receive the data indicative of the one or more frequencies 144 from the signal processor 142 and produce a single output signal that includes one or more symbols encoding the information in the bitstream 140. A digital-to-analog ("D/A") module may be configured to accept as input the output signal from the multiplexer 146 and produce an analog signal as output. The analog signal may be passed to an amplifier 150. The amplifier 150 may be used to amplify the analog signal and drive one or more speakers 104. The amplifier 150 may comprise a Class D amplifier. In other implementations, other types of amplifiers 150, such as a Class A, B, or C amplifier may be used.

The acoustic transceiver 116 of the second computing device 108 may process the payload signal 106 received via the microphone 110. For example, the acoustic transceiver 116 of the second computing device 108 may include an analog-to-digital ("A/D") module or other components usable to convert the payload signal 106 to a format suitable for decoding by the decoding module 132.

Figure 2:
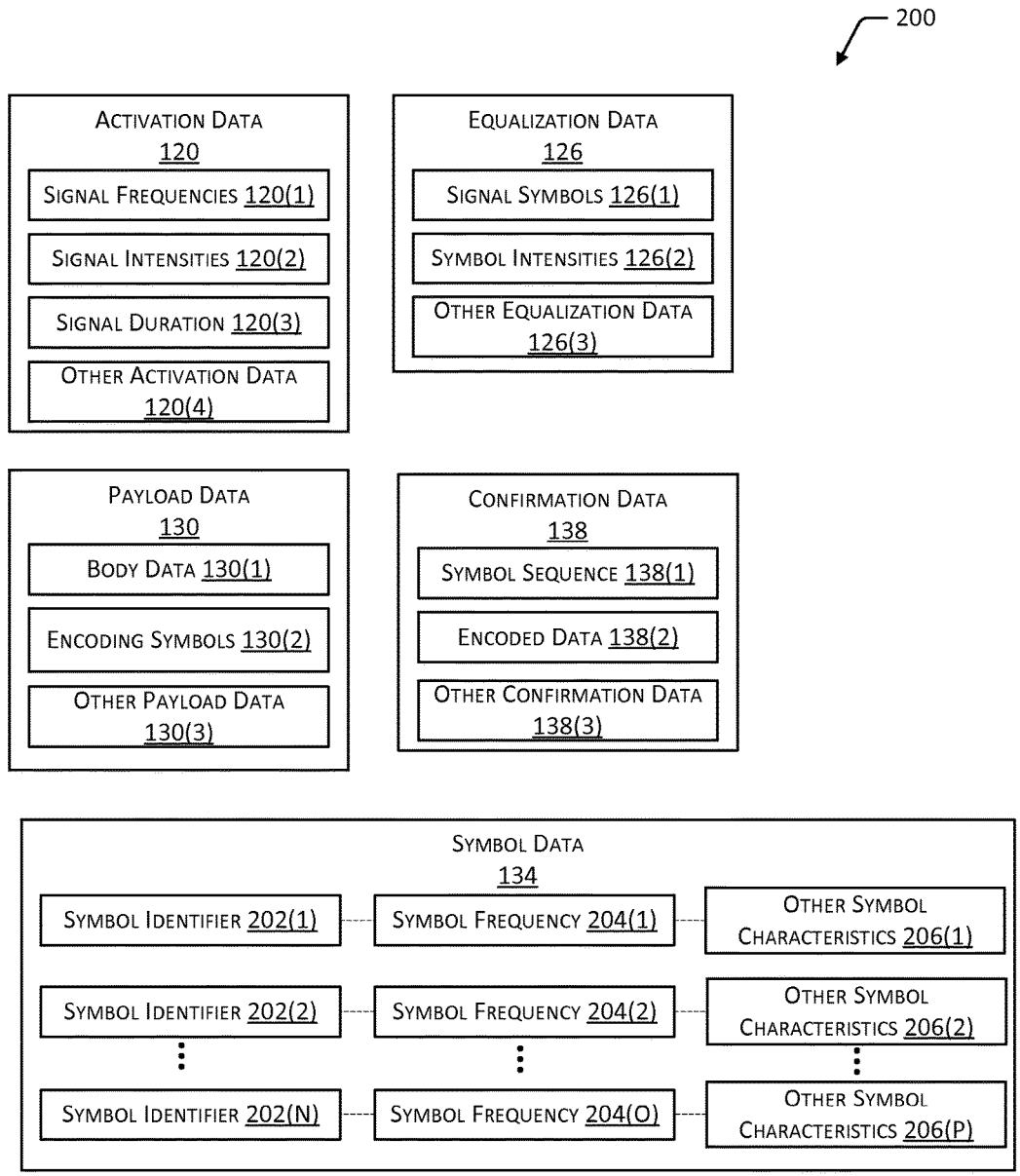
FIG. 2 is a block diagram illustrating examples of activation data, equalization data, payload data, symbol data, and confirmation data.

FIG. 2 is a block diagram 200 illustrating example implementations of activation data 120, equalization data 126, payload data 130, symbol data 134, and confirmation data 138, that may be used with the system 100 shown in FIG. 1.

The activation data 120 may include one or more characteristics of an expected activation signal 112. For example, when a signal is received by a microphone 110, correspondence between the activation data 120 and one or more characteristics of the received signal may be determined, such as by using one or more modules associated with an audio receiving device. The activation data 120 may be used to determine whether a received signal is an activation signal 112, emitted by a speaker 104 prior to emission of a payload signal 106 containing encoded payload data 130, or whether the received signal is a product of noise, such as ambient noise from the surrounding environment. The activation data 120 may further be used by an audio emitting device to generate an activation signal 112 for emission.

The activation data 120 may include one or more signal frequencies 120(1). The signal frequencies 120(1) may include one or more specific frequencies, a range of frequencies, a sequence of frequencies, and so forth. For example, an expected activation signal 112 may include a chirp activation signal that transitions from a first frequency to a second frequency over a time period, such as 4.1 ms The signal frequencies 120(1) in the activation data 120 may include one or more specific frequencies expected to be present in the activation signal 112, a range of frequencies that corresponds to the range spanning the first and second frequencies of the activation signal 112, a sequence of frequencies that corresponds to a linear transition from the first frequency to the second frequency, and so forth. Correspondence may be determined by one or more frequencies of the activation signal 112 matching the signal frequencies 120(1) of the activation data 120. In some implementations, the activation data 120 may include a tolerance. For example, correspondence may be determined if the frequencies of the activation signal 112 differ from the signal frequencies 120(1) of the activation data 120 by no more than a preselected threshold value, such as 100 Hz.

The activation data 120 may also include one or more signal intensities 120(2). The signal intensities 120(2) may include a threshold intensity that an activation signal 112 may be expected to exceed. The signal intensities 120(2) may include a range of intensities, such as a minimum intensity and a maximum intensity. In some implementations, the signal intensities 120(2) may include an intensity or range of intensities corresponding to one or more signal frequencies 120(1). For example, an activation signal 112 may be expected to be emitted with a first intensity at a first frequency, and with a greater intensity at a second frequency. In other implementations, the signal intensities 120(2) may include a sequence of intensities. For example, the intensity of an activation signal 112 may be expected to change during emission thereof. Correspondence may be determined by one or more intensities of the activation signal 112 matching the signal intensities 120(2) of the activation data 120. In some implementations, the activation data 120 may include a tolerance. For example, correspondence may be determined if the intensities of the activation signal 112 differ from the signal intensities 120(2) of the activation data 120 by no more than a preselected threshold value, such as five percent of an expected amplitude.

The activation data 120 may further include one or more signal durations 120(3). The signal duration 120(3) may include a single duration or a range of durations. In some implementations, the signal duration 120(3) may include a sequence of durations. For example, an activation signal 112 may be expected to include a sequence of symbols or frequencies, each of which may have a duration. In one implementation, an example activation signal 112 may have a duration of 4.1 seconds. Correspondence may be determined by the duration of the activation signal 112 matching the signal duration 120(3) of the activation data 120. In some implementations, the activation data 120 may include a tolerance. For example, correspondence may be determined if the duration of the activation signal 112 differs from the signal duration 120(3) of the activation data 120 by no more than a preselected threshold value, such as 1 ms Other activation data 120(4) may include threshold values by which a received activation signal 112 may differ from the activation data 120. Other activation data 120(4) may include times at which an activation signal 112 must be received for correspondence to be determined. Other activation data 120(4) may also include a length of time after receipt of an activation signal 112 by which a payload signal 106 must be received prior to the cessation of decoding by the second computing device 108. In some implementations, other activation data 120(4) may include stored waveforms, to which a received activation signal 112 may be compared to determine correspondence.

The equalization data 126 may include one or more characteristics of an equalization signal 122 that may be used to determine that one or more of a speaker 104 or a microphone 110 is capable of emitting or receiving, respectively, at least a portion of the symbols used to encode the payload data 130. For example, ambient noise may prevent emission or reception of payload signals 106, such as by corrupting the payload signals 106 or the corresponding data. In some circumstances, equipment limitations may prevent successful emission or reception of payload signals 106. For example, some types of audio emitters or audio receivers may be incapable of reliably producing or receiving signals in the ultrasonic spectrum, such as signals having a frequency greater than 18,000 Hz. A lack of correspondence between the equalization signal 122 and the equalization data 126 may cause a first computing device 102 to cease emitting a payload signal 106 or cause a second computing device 108 to cease decoding a payload signal 106. Cessation of decoding may prevent the consumption of power or computing resources associated with attempts to decode data encoded by symbols that may not be reliably produced or received by audio emitting or audio receiving devices.

The equalization data 126 is shown including one or more signal symbols 126(1). The signal symbols 126(1) may include at least a portion of the symbols used to encode the payload data 130. As described previously, one example encoding scheme may include use of four symbols, each having one or more frequencies ranging from 18,130 Hz to 19,600 Hz. The signal symbols 126(1) of the equalization data 126 may include each of the four symbols, in which one or more frequencies may correspond to each symbol. A received equalization signal 122 may include at least one instance of each symbol. Correspondence may be determined by the symbols of the received equalization signal 122 matching the signal symbols 126(1) of the equalization data 126. A lack of correspondence may be determined if one or more signal symbols 126(1) of the equalization data 126 is not received in the equalization signal 122, or if the equalization signal 122 includes symbols not stored as equalization data 126.

The equalization data 126 may also include one or more symbol intensities 126(2). For example, one or more of the signal symbols 126(1) may include a corresponding symbol intensity 126(2). The symbol intensities 126(2) may include a single threshold intensity that a received symbol may be expected to exceed. The symbol intensities 126(2) may include a range of intensities, such as a minimum intensity and a maximum intensity. In some implementations, the symbol intensities 126(2) may include an intensity or range of intensities corresponding to one or more of the signal symbols 126(1). For example, if one or more symbols in an equalization signal 122 are received at an intensity insufficient to enable reliable decoding thereof, a lack of correspondence between the equalization data 126 and the equalization signal 122 may be determined. In some implementations, a second computing device 108 may cease decoding a payload signal 106 responsive to a lack of correspondence between the equalization data 126 and the equalization signal 122. In other implementations, a variance between the expected intensity of one or more symbols and the intensity of the symbol received in an equalization signal 122 may be determined, such as through use of one or more modules associated with the second computing device 108. The subsequent payload signal 106 encoding the payload data 130 may be modified based on the variance. For example, if the intensity of one or more symbols in a received equalization signal 122 is greater or less than a symbol intensity 126(2) of the equalization data 126, the signal encoding the payload data 130 may be emitted with a lower or higher intensity, respectively. In other implementations, the sensitivity of the audio receiving device at one or more frequencies may be modified to compensate for the variance.

Other equalization data 126(3) may include a sequence of symbols, a duration of one or more symbols, and so forth. For example, a minimum symbol duration may be used to facilitate encoding and decoding of the payload data 130. Other equalization data 126(3) may include a length of time after receipt of an equalization signal 122 by which a payload signal 106 must be received prior to cessation of decoding by the second computing device 108. Other equalization data 126(3) may include a length of time before resending an additional equalization signal 122, after a determination by the equalization module 124 of a lack of correspondence between the equalization signal 122 and the equalization data 126.

The payload data 130 may include data emitted by the first computing device 102 that relates to the fundamental purpose of the transmission. As such, the payload data 130 is depicted including the body data 130(1) (e.g., the cargo or actual data). The body data 130(1) may include any manner of data, such as alphanumeric data, audio data, video data, image data, computer instructions for execution by a processor, metadata, data structures, and so forth. For example, the body data 130(1) may include network credentials or other types of information that may be used to configure a device. To communicate the body data 130(1) using payload signals 106, at least a portion of the body data 130(1) may be encoded using one or more symbols, each symbol having one or more frequencies associated therewith.

The payload data 130 may also include encoding symbols 130(2). Each encoding symbol 130(2) may represent a tone provided at a certain frequency or range of frequencies. The encoding symbols 130(2) may also include one or more of a corresponding intensity or duration. As described previously, one example encoding scheme may include four symbols, each having one or more frequencies ranging from 18,130 Hz to 19,600 Hz. The frequency of each symbol may differ from that of each other symbol by 490 Hz. Spacing of the symbols by a selected frequency may limit interference between symbols, maintain the symbols in continuous phase to limit distortions (e.g., audible pops) in the emission thereof, and facilitate reliable decoding of data therefrom.

Other payload data 130(3) may include a length field that indicates a length of the body data 130(1), one or more error detection or correction schemes, such as a CRC, one or more registration tokens, one or more set service identifiers (SSID), one or more keys, and so forth. In one implementation, a length field, having a length of 8 bits, may precede a CRC having a length of 16 bits. The CRC may precede a registration token, a SSID, and a key. Packets of the body data 130(1) may be of variable lengths. Other payload data 130(3) may further include encryption schemes, encryption keys, data or instructions usable to process or modify the body data 130(1), and so forth.

The symbol data 134 may include pre-calculated, stored samples associated with one or more symbols that may be used to encode and transmit payload data 130. For example, each symbol may include a corresponding symbol identifier 202, usable to differentiate one symbol from other symbols. As illustrated in FIG. 1, four symbols, each identified by a single numeral, such as "0," "1," "2," and "3," may be used, with the numerals functioning as symbol identifiers 202. Each symbol may include a corresponding symbol frequency 204. Continuing the example, as described previously, one possible encoding scheme may include a first symbol, "0," having a frequency of 18,130 Hz, a second symbol, "1," having a frequency of 18,620 Hz, a third symbol, "2," having a frequency of 19,110 Hz, and a fourth symbol, "3," having a frequency of 19,600 Hz. Other symbol characteristics 206 may include a symbol duration or intensity, traits of the tone associated with the symbol, and so forth.

FIG. 2 depicts a first symbol identifier 202(1) stored in association with a first symbol frequency 204(1), and one or more other symbol characteristics 206(1). Similarly, a second symbol identifier 202(2) is stored in association with a second symbol frequency 204(2) and one or more other symbol characteristics 206(2). One or more other symbol identifiers 202(N) may be stored in association with one or more other symbol frequencies 204(0) and other symbol characteristics 206(P). As used in this disclosure, letters in parenthesis such as "(N)" indicate an integer value. Any number of symbols may be used to encode the payload data 130. Use of a larger number of symbols may facilitate more accurate encoding of data for emission, while use of a smaller number of symbols may allow each symbol to be spaced from each other symbol by a larger frequency, facilitating decoding of received symbols by the second computing device 108.

The confirmation data 138 may be used to determine whether a received audio signal is a payload signal 106 carrying encoded payload data 130. The confirmation data 138 may also be used to determine whether the audio signal is a product of noise or corrupted by noise or equipment limitations to an extent that may prevent decoding thereof. For example, a payload signal 106 may include both the payload data 130 and initialization data 128. The initialization data 128 may include an expected sequence of symbols. The confirmation data 138 may include a symbol sequence 138(1) or encoded data 138(2) that corresponds to the symbol sequence 138(1) that may be used to identify the payload signal 106. Other confirmation data 138(3) may include other characteristics of the symbol sequence 138(1), such as expected intensities or durations of one or more symbols.

When a payload signal 106 is received by a second computing device 108, the confirmation data 138 may be accessed to determine correspondence between the confirmation data 138 and the payload signal 106. For example, an uncorrupted payload signal 106 encoding payload data 130 may be emitted with initialization data 128 having an expected symbol sequence 138(1). A second computing device 108 may receive the initialization data 128 and determine correspondence between the symbol sequence 138(1) of the initialization data 128 and that of the confirmation data 138. In some implementations, the initialization data 128 may be decoded, and correspondence between the encoded data 138(2) and the decoded initialization data 128 may be determined. When correspondence between the initialization data 128 and the confirmation data 138 is determined, the second computing device 108 may continue to decode the payload signal 106 to access the payload data 130.

When a lack of correspondence between an audio signal and the confirmation data 138 is determined, the second computing device 108 may cease decoding the audio signal. A lack of correspondence between the audio signal and the confirmation data 138 may occur due to the audio signal being a product of noise rather than a payload signal 106. Processing noise that is incorrectly detected as a potential payload signal 106 may consume power, computing resources, and time of the second computing device 108. If an activation signal 112, equalization signal 122, or payload signal 106 is emitted during a time when the second computing device 108 is attempting to decode noise that was improperly detected as a signal carrying one or more data packets, the emitted signal may remain undetected by the second computing device 108. Determination of a lack of correspondence between an audio signal and the confirmation data 138 may enable the second computing device 108 to cease attempting to decode a flawed audio signal promptly, conserving time, power, and computing resources while decreasing the likelihood that a subsequent payload signal 106 encoding payload data 130 will be missed.

Additionally, in some circumstances, a payload signal 106 encoding payload data 130 may be corrupted, such as due to an excess amount of noise. While use of a CRC or other error detecting or correcting scheme may detect corruption of a payload signal 106, in some cases, the length field of a data packet may be corrupted. If a corrupted length field is large, the second computing device 108 may expend a considerable amount of time attempting to decode the payload signal 106 before the CRC or other error detecting scheme indicates failure. During this time, power and computing resources are consumed, and additional payload signals 106 may be missed by the second computing device 108. Determination of a lack of correspondence between the payload signal 106 and the confirmation data 138 may enable the second computing device 108 to cease attempting to decode a corrupted payload signal 106 promptly, avoiding these disadvantages.

Figure 3:
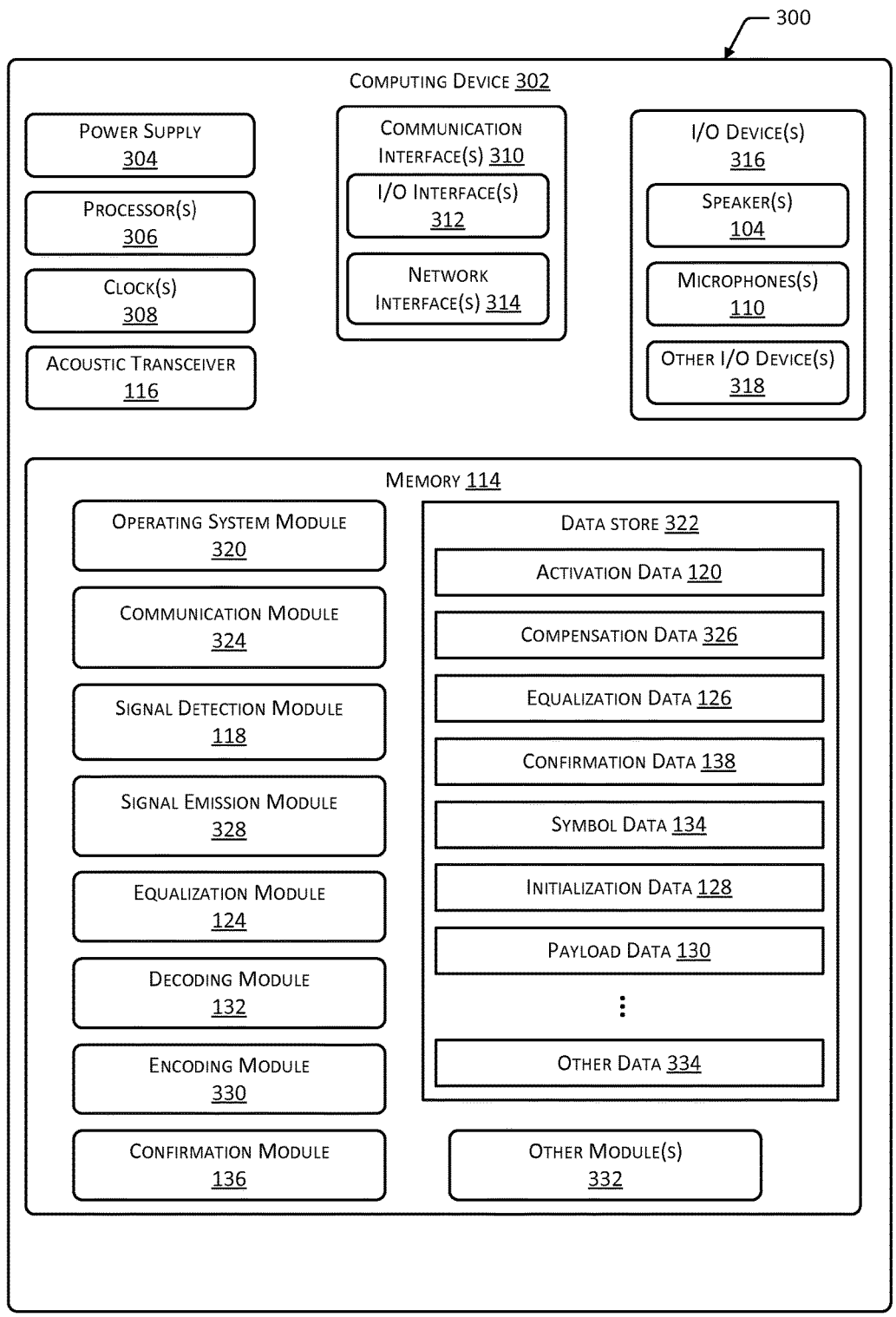
FIG. 3 is a block diagram illustrating a computing device within the scope of the present disclosure.

FIG. 3 illustrates a block diagram 300 of a computing device 302 configured to support operation of the system 100. The computing device 302 may include the first computing device 102, the second computing device 108, one or more servers, or other computing devices 302 in communication therewith. Computing devices 302 may further include CRSM or libraries accessible to the first computing device 102, second computing device 108, one or more servers, or other computing devices 302.

One or more power supplies 304 may be configured to provide electrical power suitable for operating the components in the computing device 302. In some implementations, the power supply 304 may include a rechargeable battery, fuel cell, photovoltaic cell, power conditioning circuitry, and so forth.

The computing device 302 may include one or more hardware processors 306 (processors) configured to execute one or more stored instructions. The processor(s) 306 may include one or more cores, may be application processing units (APUs), digital signal processors (DSPs), graphics processing units (GPUs). One or more clocks 308 may provide information indicative of date, time, ticks, and so forth. For example, the processor(s) 306 may use data from the clock 308 to generate a timestamp, trigger a preprogrammed action, and so forth.

The computing device may include an acoustic transceiver 116. The acoustic transceiver 116 may include one or both of an acoustic transmitter, which may be used to generate audio signals from received or stored data, or an acoustic receiver, which may be used to receive and process audio signals to extract data therefrom. Audio signals produced by an acoustic transceiver 116 may be emitted using one or more speakers 104, while audio signals received by an acoustic transceiver may be received using one or more microphones 110. The acoustic transceiver 116 may include the signal processor 142, the multiplexer 146, the D/A module 148, amplifier 150, and so forth. The acoustic transceiver 116 may be coupled to other devices. For example, the amplifier 150 may be coupled to the speakers 104.

The computing device 302 may include one or more communication interfaces 310, such as input/output (I/O) interfaces 312, network interfaces 314, and so forth. The communication interfaces 310 may include audio communication interfaces that may be used to emit and receive audio signals, decode or otherwise process or analyze the audio signals, and cause the processor(s) 306 to act responsive to the audio signals. The communication interfaces 310 may enable the computing device 302, or components thereof, to communicate with other devices or components. The I/O interfaces 312 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 312 may couple to one or more I/O devices 316. The I/O devices 316 may include any manner of input device or output device associated with the first computing device 102, the second computing device 108, a server, or other computing device 302. For example, I/O devices 316 may include speakers 104 that may be used to emit audio signals, microphones 110 that may be used to receive audio signals, and so forth. Other I/O devices 318 may include devices used for interacting with computing devices 302, such as touch sensors, buttons, keyboards, mouse devices, cameras, scanners, displays, haptic devices, printers, and so forth. In some implementations, the I/O devices 316 may be physically incorporated with the computing device 302 or may be externally placed.

The network interfaces 314 may be configured to provide communications between the computing device 302 and other devices, such as the I/O devices 316, routers, access points, and so forth. The network interfaces 314 may include devices configured to couple to one or more networks including LANs, wireless LANs, WANs, wireless WANs, and so forth. For example, the network interfaces 314 may include devices compatible with Ethernet, Wi-Fi™, Bluetooth®, ZigBee®, Z-Wave, 3G, 4G, LTE, and so forth.

The computing device 302 may include one or more busses or other internal communications hardware or software that allows for the transfer of data between the various modules and components of the computing device 302.

As shown in FIG. 3, the computing device 302 may include one or more memories 114. The memory 114 may include one or more CRSM. The CRSM may be any one or more of an electronic storage medium, a magnetic storage medium, an optical storage medium, a quantum storage medium, a mechanical computer storage medium, and so forth. The memory 114 may provide storage of computer-readable instructions, data structures, program modules, and other data for the operation of the computing device 302. A few example modules are shown stored in the memory 114, although the same functionality may alternatively be implemented in hardware, firmware, or as a system on a chip (SoC).

The memory 114 may include one or more operating system (OS) modules 320. The OS module 320 may be configured to manage hardware resource devices such as the I/O interfaces 312, the network interfaces 314, the I/O devices 316, and to provide various services to applications or modules executing on the processors 306. The OS module 320 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 322 and one or more of the following modules may also be stored in the memory 114. The modules may be executed as foreground applications, background tasks, daemons, and so forth. The data store 322 may use a flat file, database, linked list, tree, executable code, script, or other data structure to store information. In some implementations, the data store 322 or a portion of the data store 322 may be distributed across one or more other devices including the computing devices 302, network attached storage devices, and so forth.

A communication module 324 may be configured to establish communications with one or more other computing devices 302, such as the first computing device 102, the second computing device 108, one or more servers, remote CRSM, and so forth. The communications may be authenticated, encrypted, and so forth.

The memory 114 may store the signal detection module 118. The signal detection module 118 may receive and process activation signals 112 and access activation data 120 stored in the data store 322. The signal detection module 118 may be used to determine correspondence between the activation signal 112 and the activation data 120, such as by determining whether a received activation signal 112 corresponds to one or more signal frequencies 120(1), signal intensities 120(2), or signal durations 120(3). If correspondence is determined, the signal detection module 118 may cause the computing device 302 to begin decoding subsequent payload signals 106. If a lack of correspondence is determined, decoding components of a computing device 302 may remain inactive while the computing device 302 attempts to detect subsequent activation signals 112.

In some implementations, the signal detection module 118 may determine a variance between the intensity of one or more frequencies in the activation signal 112 and an expected intensity stored in the activation data 120. Variances may be stored as compensation data 326. The compensation data 326 may be used to modify the subsequent generation of payload signals 106. For example, the compensation data 326 may indicate that a speaker 104 is emitting signals having a low intensity at certain frequencies, or that a microphone 110 is receiving signals having a low intensity at certain frequencies. Responsive to this variance, the first computing device 102 may modify the intensity of the emitted payload signals 106 at those frequencies, or the second computing device 108 may modify a sensitivity of received payload signals 106 at those frequencies.

The memory 114 may also store a signal emission module 328. The signal emission module 328 may be used to generate and cause emission of activation signals 112. In some implementations, the signal emission module 328 may access activation data 120 and generate activation signals 112 using at least a portion of the activation data 120. A second computing device 108 associated with the activation data 120 may determine correspondence between the activation data 120 and the activation signal 112. In other implementations, the signal emission module 328 may emit a signal responsive to receipt of an activation signal 112. The responsive signal may include one or more variances that may be stored as compensation data 326. The signal emission module 328 may further be used to generate or emit subsequent signals, such as equalization signals 122 and payload signals 106. In some implementations, the signal emission module 328 may access compensation data 326 to determine one or more modifications to be made to a signal prior to emission thereof.

The memory 114 may further store the equalization module 124. The equalization module 124 may receive and process equalization signals 122 and access equalization data 126 stored in the data store 322. The equalization module 124 may be used to determine correspondence between equalization symbols within the equalization signals 122 and the equalization data 126. For example, the equalization data 126 may include one or more equalization symbols and a threshold intensity for each of the equalization symbols. Correspondence may be determined between the equalization data 126 and an equalization signal 122 if the intensity for one or more equalization symbols contained in the equalization signal 122 is equal to or exceeds the corresponding threshold intensity in the equalization data 126. A lack of correspondence may be determined if the equalization signal 122 includes symbols not present in the equalization data 126, if the equalization data 126 includes symbols not present in the equalization signal 122, or if one or more equalization symbols are received at an intensity less than a threshold intensity stored in the equalization data 126.

In some implementations, the equalization module 124 may determine a variance between the intensity of one or more equalization symbols in the equalization signal 122 and a threshold intensity of the equalization data 126. The variance(s) may be stored as compensation data 326, which may be used to modify subsequent payload signals 106 produced by a computing device 302 or a sensitivity of a computing device 302 receiving the subsequent payload signals 106. In other implementations, responsive to receipt of the equalization signal 122, the equalization module 124 may cause generation and transmission of a confirmation signal by a receiving device for receipt by a device emitting the equalization signal 122. For example, a confirmation signal may be provided upon determination of correspondence between the equalization signal 122 and the equalization data 126.

The memory 114 may store the decoding module 132. The decoding module 132 may be used to decode symbols in a received payload signal 106, which may include initialization data 128 and payload data 130. In some implementations, the decoding module 132 may access symbol data 134 that includes an encoding scheme associated with the symbols used to encode payload data 130 carried by the payload signal 106. The decoding module 132 may begin decoding responsive to receipt of an activation signal 112 from an audio emitting device and a determination of correspondence between the activation signal 112 and the activation data 120. In some implementations, the decoding module 132 may begin decoding responsive to receipt of an equalization signal 122 from an audio emitting device and a determination of correspondence between the equalization signal 122 and the equalization data 126. The decoding module 132 may be configured to cease decoding audio signals responsive to a determination of a lack of correspondence between the activation signal 112 and the activation data 120. The decoding module 132 may also be configured to cease decoding audio signals responsive to a determination of a lack of correspondence between the equalization signal 122 and the equalization data 126.

An encoding module 330 may also be stored in the memory 114. The encoding module 330 may be used to encode payload data 130 as payload signals 106. The encoding module 330 may also be used to encode other types of data, such as confirmation of receipt of activation signals 112 or equalization signals 122, as audio signals for emission. The encoding module 330 may access the symbol data 134 for encoding one or more types of data using symbols for transmission as audio signals.

The memory 114 may further store the confirmation module 136. The confirmation module 136 may receive and process at least a portion of a payload signal 106 emitted by an audio emitting device. For example, initialization data 128 or other data carried by a payload signal 106 may be received and decoded by an audio receiving device. The confirmation module 136 may access confirmation data 138 in the data store 322 to determine correspondence between data decoded from a payload signal 106 and the confirmation data 138. For example, a payload signal 106 carrying encoded payload data 130 may include initialization data 128 that includes a sequence of symbols. Correspondence between the received initialization data 128 and the confirmation data 138 may be determined by the confirmation module 136. Responsive to a determination of correspondence, the decoding module 132 may continue decoding the payload signal 106. Responsive to a determination of a lack of correspondence between the payload signal 106 and the confirmation data 138, the decoding process may cease, preventing consumption of power, time, and computing resources of the computing device 302. Additionally, cessation of the decoding process by the computing device 302 may reduce the likelihood that a subsequent activation signal 112, equalization signal 122, or payload signal 106 will be missed.

In some implementations, one or more functions of the acoustic transceiver 116 may be stored as instructions in the memory 114 and executed on the processor 306. For example, the signal processor may be implemented as instructions executing on the processor 306.

Other modules 332 may also be present in the memory 114. For example, encryption modules may be used to encrypt and decrypt communications between computing devices 302. User interface modules may be used to enable users to interact with computing devices 302 to modify activation data 120, equalization data 126, confirmation data 138, or symbol data 134. User interface modules may further be used to enable users to provide payload data 130 for encoding and emission, to access received data, and so forth. Output generation modules may be used to provide confirmations, indications of received or emitted signals, data, and so forth to users. Other data 334 may be stored in the data store 322 and may include encryption data, registration tokens, one or more SSIDs, one or more keys, data associated with a length field of a payload signal 106, data associated with a CRC or other type of error detecting feature, and so forth.

In some implementations, different computing devices 302 may have different capabilities or capacities. For example, the first computing device 102 may have significantly more processor 306 capability and memory 114 capacity compared to the second computing device 108.

Figure 4:
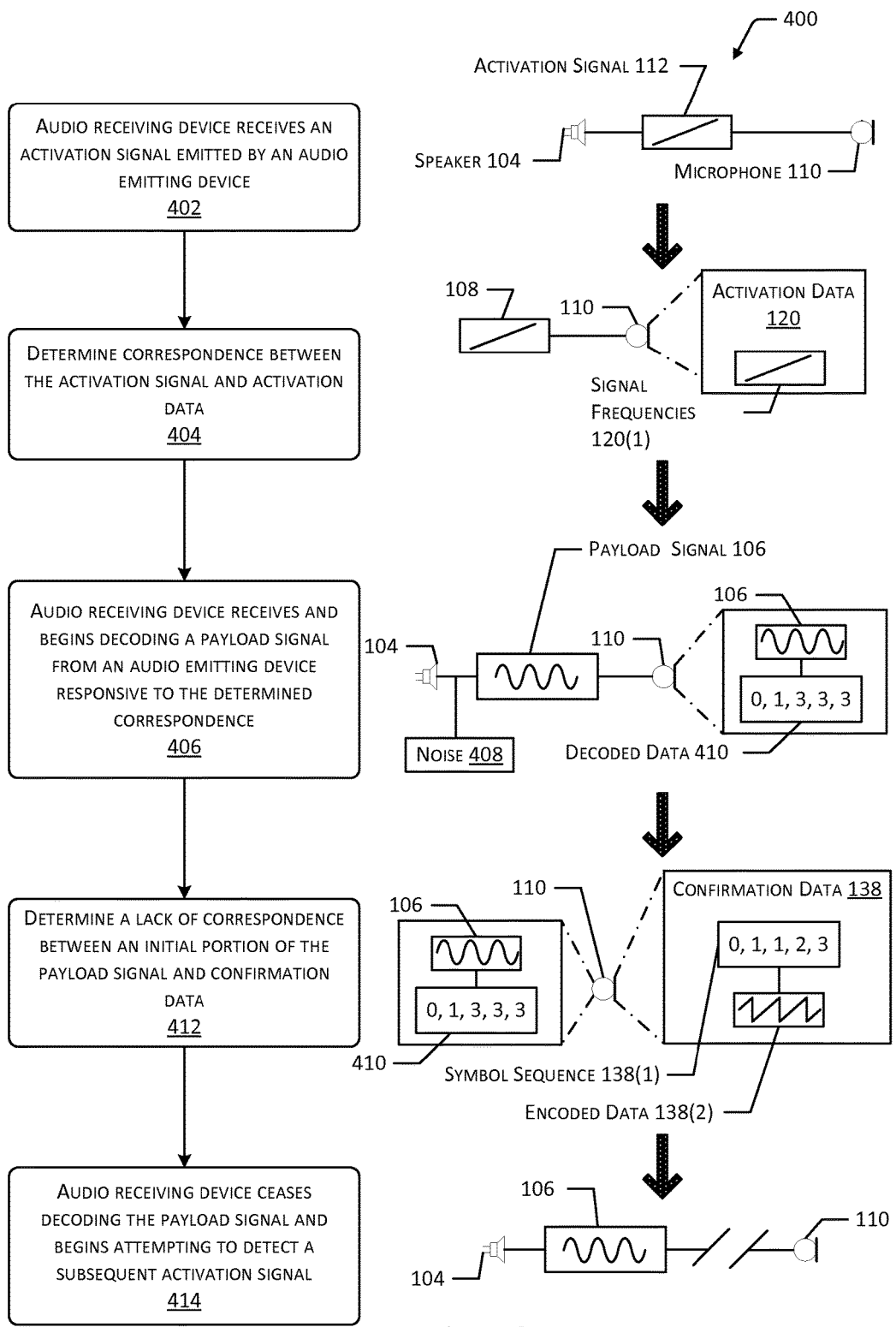
FIG. 4 is a method for receiving an audio signal and using confirmation data to determine whether to decode or cease decoding the audio signal.

FIG. 4 depicts a method 400 for receiving (e.g., by a computing device 302) one or more payload signals 106 and using confirmation data 138 to determine whether to decode the payload signal(s) 106 or cease decoding the payload signal(s) 106. At 402, an audio receiving device, which may include a microphone 110 or similar receiver, receives an activation signal 112 emitted by an audio emitting device, which may include one or more speakers 104 or other types of audio output devices. The activation signal 112 may include one or more frequencies, provided at one or more intensities for a given duration. For example, an activation signal 112 may include a chirp activation signal that transitions from a first frequency to a second frequency over a period of time, such as 4.1 ms.

At 404, correspondence between the activation signal 112 and activation data 120 may be determined. The activation data 120 may be stored in association with a computing device 302 having the microphone 110 or other audio receiver. For example, the activation data 120 may include one or more signal frequencies 120(1). A signal detection module 118 associated with the microphone 110 may detect and process the activation signal 112 and determine correspondence between one or more characteristics of the activation signal 112 and the activation data 120. Continuing the example, the signal frequencies 120(1) of the activation data 120 may match or fall within a threshold variance of the frequencies of the received activation signal 112. In other implementations, the activation data 120 may include signal intensities 120(2) at one or more frequencies, a signal duration 120(3), and so forth.

At 406, the audio receiving device may receive and begin decoding a payload signal 106 emitted by an audio emitting device, responsive to the determined correspondence between the activation signal 112 and the activation data 120. In the depicted method 400, noise 408 may corrupt or otherwise affect the emitted payload signal 106. The detected payload signal 106 affected by noise 408 may include a sequence of symbols, such as "0, 1, 3, 3, 3", which may be decoded using a decoding module 132 to yield decoded data 410. In some implementations, a payload signal 106 may be expected to include initialization data 128 having an expected symbol sequence 138(1). The audio receiving device may decode an initial portion of the received payload signal 106 to determine whether the initial portion corresponds to the expected initialization data 128.

At 412, a lack of correspondence between an initial portion of the payload signal 106 and confirmation data 138 associated with the audio receiving device may be determined. In the depicted method 400, the payload signal 106 includes a sequence of symbols "0, 1, 3, 3, 3" that does not correspond to the symbol sequence 138(1) "0, 1, 1, 2, 3" of the confirmation data 138. As a result, the decoded data 410 obtained by decoding an initial portion of the payload signal 106 does not match the encoded data 138(2) that corresponds to the symbol sequence 138(1). The lack of correspondence between the payload signal 106 and the confirmation data 138 may indicate that the received payload signal 106 has been corrupted by noise 408. In other implementations, the received audio signal may be a product of noise 408 rather than a payload signal 106. As such, the received payload signal 106 may lack the expected initialization data 128. In some circumstances, the payload signal 106 may include encoded payload data 130, but noise 408 or equipment limitations may cause corruption of the payload signal 106. Corruption of the payload signal 106 may prevent proper decoding of the initialization data 128, such that correspondence with the confirmation data 138 is not determined.

At 414, the audio receiving device ceases decoding the payload signal 106 and begins attempting to detect a subsequent activation signal 112. By promptly ceasing decoding of a potentially flawed payload signal 106, the audio receiving device may conserve power, computing resources, time, and so forth. Furthermore, prompt cessation of the decoding may minimize the likelihood that a subsequent audio signal may be undetected during the time that the audio receiving device attempts to decode the flawed audio signal.

Figure 5:
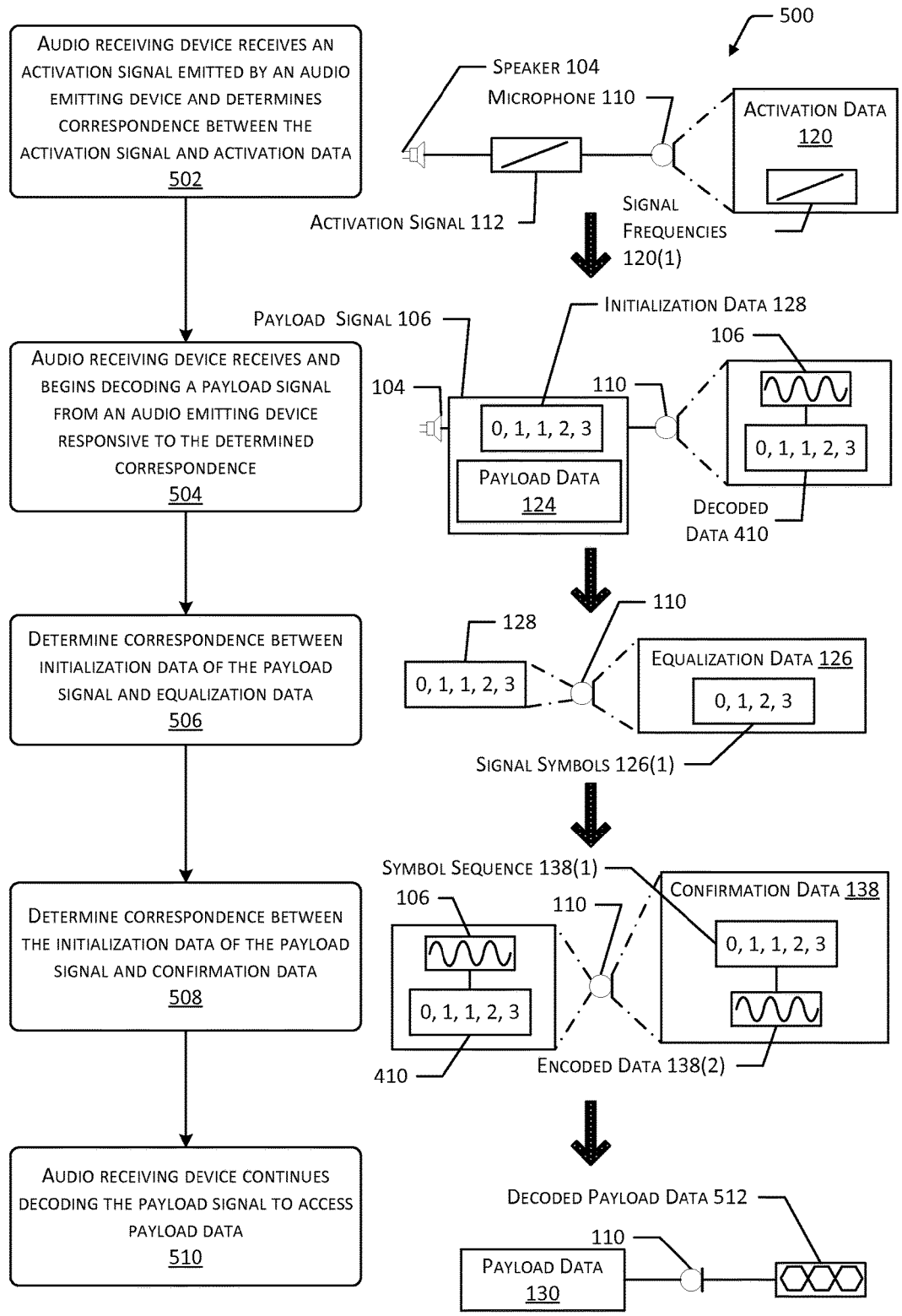
FIG. 5 is a method for determining correspondence between an initialization data of a payload signal and confirmation data to determine whether to decode the remainder of the payload signal.

FIG. 5 depicts a method 500 for determining correspondence between initialization data 128 of a payload signal 106 and both equalization data 126 and confirmation data 138 to determine whether to decode the remainder of the payload signal 106. At 502, an audio receiving device, which may include a microphone 110, receives an activation signal 112 emitted by an audio emitting device, which may include a speaker 104. The audio receiving device determines correspondence between the activation signal 112 and activation data 120. For example, the activation signal 112 may include one or more frequencies, such as a chirp activation signal that transitions across a range of frequencies over a period of time. The activation data 120 may include one or more signal frequencies 120(1), and correspondence between the signal frequencies 120(1) of the activation data 120 and the frequencies of the activation signal 112 may be determined, such as through use of a signal detection module 118. In other implementations, the activation data 120 may include one or more signal intensities 120(2) or signal durations 120(3), and correspondence between the activation data 120 and the intensity or duration of the activation signal 112 may be determined.

At 504, the audio receiving device may receive and begin decoding a payload signal 106 responsive to the determined correspondence between the activation signal 112 and the activation data 120. The depicted payload signal 106 includes initialization data 128 comprising a sequence of symbols, "0, 1, 1, 2, 3," that precedes the payload data 130. The audio receiving device may receive and decode the initialization data 128 to yield decoded data 410.

At 506, correspondence between the initialization data 128 of the payload signal 106 and equalization data 126 is determined. For example, equalization data 126 associated with the audio receiving device may include one or more signal symbols 126(1). In the depicted method 500, the signal symbols 126(1) include four symbols: "0, 1, 2, 3." Correspondence between the initialization data 128 of the payload signal 106 and the equalization data 126 may be determined by comparing the signal symbols 126(1) to the symbols of the initialization data 128. If each symbol of the initialization data 128 matches one of the signal symbols 126(1), correspondence may be determined. If the initialization data 128 includes one or more symbols not included in the equalization data 126, or if the equalization data 126 includes one or more symbols not present in the initialization data 128, a lack of correspondence may be determined. Failure to determine proper emission or receipt of one or more symbols may hinder or prevent decoding of the payload signal 106. In other implementations, correspondence between the payload signal 106 and the equalization data 126 may be determined using only a portion of the signal symbols 126(1) or only a portion of the symbols in the initialization data 128. In other implementations, the symbol intensity 126(2) of the equalization data 126 may be used to determine whether the intensity of each received symbol meets or exceeds a threshold intensity.

At 508, correspondence between the initialization data 128 of the payload signal 106 and confirmation data 138 associated with the audio receiving device is determined. For example, as depicted in the method 500, the confirmation data 138 may include a symbol sequence 138(1) "0, 1, 1, 2, 3" that is expected to be received in the initialization data 128 of a payload signal 106 or encoded data 138(2) that corresponds to the symbol sequence 138(1) of confirmation data 138. Correspondence may be determined between the confirmation data 138 and the received initialization data 128 or between the confirmation data 138 and the decoded data 410 obtained by decoding the initialization data 128. A determination of correspondence between the initialization data 128 and the confirmation data 138 may indicate that the payload signal 106 is not a product of noise 408 and has not been corrupted by noise 408, equipment limitations, and so forth. The determination of correspondence between the initialization data 128 and the confirmation data 138 may also indicate the remainder of the payload signal 106 includes payload data 130. A lack of correspondence may indicate that the payload signal 106 is a product of noise 408. A lack of correspondence may also indicate that the payload signal 106 has been corrupted due to noise 408, equipment limitations, and so forth.

In the depicted method 500, the symbols of the initialization data 128 of the payload signal 106 may also be used as equalization symbols to test suitable emission and reception of symbols used to encode the payload data 130. The initialization data 128 may also be used to confirm that the payload signal 106 is not a product of noise 408 or affected by noise 408 in order to prevent decoding of noise 408 or corrupted signals. In other implementations, a separate equalization signal 122 that includes one or more equalization symbols may be provided, and correspondence between the equalization signal 122 and the equalization data 126 may be determined before the initialization data 128 of the payload signal 106 is received and decoded by the audio receiving device.

At 510, responsive to correspondence between the initialization data 128 and the confirmation data 138, the audio receiving device may continue decoding the payload signal 106 to access the payload data 130. For example, a decoding module 132 associated with the audio receiving device may decode a series of symbols used to encode the payload data 130 to yield decoded payload data 512.

Figure 6:
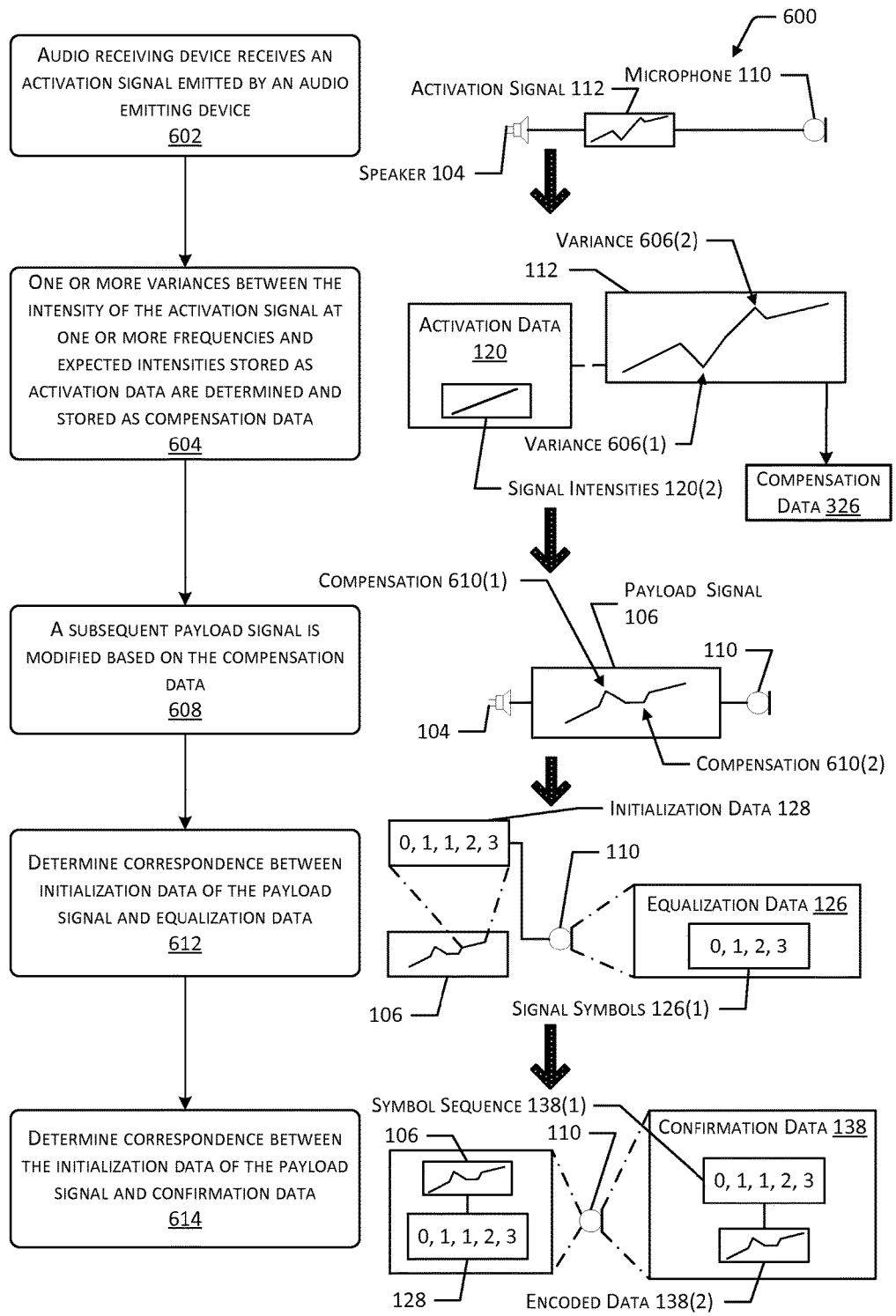
FIG. 6 is a method for determining variances in intensities of one or more frequencies from an activation signal and modifying a subsequent payload signal using the variances.

FIG. 6 depicts a method 600 for determining variances in intensities of one or more frequencies of an activation signal 112 and modifying a subsequent payload signal 106 based on this determination. At 602, an audio receiving device, which may be associated with a microphone 110, may receive an activation signal 112 emitted by an audio emitting device, which may be associated with one or more speakers 104. The activation signal 112 may include one or more frequencies with each frequency having a corresponding intensity.

At 604, one or more variances 606 between the intensity of the activation signal 112 at one or more frequencies and expected intensities stored as activation data 120 may be determined and stored as compensation data 326. For example, the activation data 120 may include one or more signal intensities 120(2) representative of an expected activation signal 112 having a generally constant intensity across a range of frequencies. The received activation signal 112 may include a first variance 606(1), indicating a lesser intensity than expected at a first frequency, and a second variance 606(2), indicating a greater intensity than expected at a second frequency. The variances 606 may be stored as compensation data 326. Variances 606 may be detected by the audio emitting device when emitting the activation signal 112 or by the audio receiving device when receiving the activation signal 112. In some implementations, the audio receiving device may generate and provide a responsive signal to the audio emitting device. One or both of the audio emitting device or the audio receiving device may access the activation data 120 to determine the variances 606. While FIG. 6 depicts variances 606 determined using frequencies of an activation signal 112, in other implementations, variances 606 may be determined from the intensity of equalization symbols emitted in an equalization signal 122.

At 608, a subsequent payload signal 106 is modified based on the compensation data 326. For example, the depicted payload signal 106 includes a first compensation 610(1) corresponding to the first variance 606(1), and a second compensation 610(2) corresponding to the second variance 606(2). Continuing the example, if the first variance 606(1) indicates an intensity less than the expected intensity indicated by the activation data 120, the first compensation 610(1) in the payload signal 106 may include an increased intensity at one or more frequencies. If the second variance 606(2) indicates an intensity greater than the expected intensity indicated by the activation data 120, the second compensation 610(2) may include a decreased intensity at one or more frequencies.

In some implementations, the audio emitting device may be configured to access the compensation data 326 and produce a modified payload signal 106 responsive to variances 606 in the compensation data 326. In other implementations, the audio receiving device may be configured to adjust a sensitivity thereof at one or more frequencies responsive to variances 606 in the compensation data 326.

At 612, correspondence between initialization data 128 of the payload signal 106 and equalization data 126 associated with the audio receiving device may be determined. As described previously, the equalization data 126 may include one or more signal symbols 126(1). Correspondence between the initialization data 128 of the payload signal 106 and the equalization data 126 may be determined, for example, by comparing one or more of the signal symbols 126(1) or symbol intensities 126(2) to the symbols of the initialization data 128 and the intensity at which the symbols were received.

At 614, correspondence between the initialization data 128 of the payload signal 106 and confirmation data 138 associated with the audio receiving device may be determined. As described previously, the confirmation data 138 may include a symbol sequence 138(1) or encoded data 138(2) that corresponds to the symbol sequence 138(1). Correspondence may be determined between the confirmation data 138 and the received initialization data 128 or the decoded data 410 obtained by decoding the initialization data 128. A determination of correspondence between the initialization data 128 and the confirmation data 138 may cause the audio receiving device to decode the remainder of the payload signal 106. A lack of correspondence may indicate that the payload signal 106 is a product of noise 408 or has been corrupted due to noise 408, equipment limitations, and so forth. Further, the lack of correspondence may cause the audio receiving device to cease decoding the payload signal 106.

Figure 7:
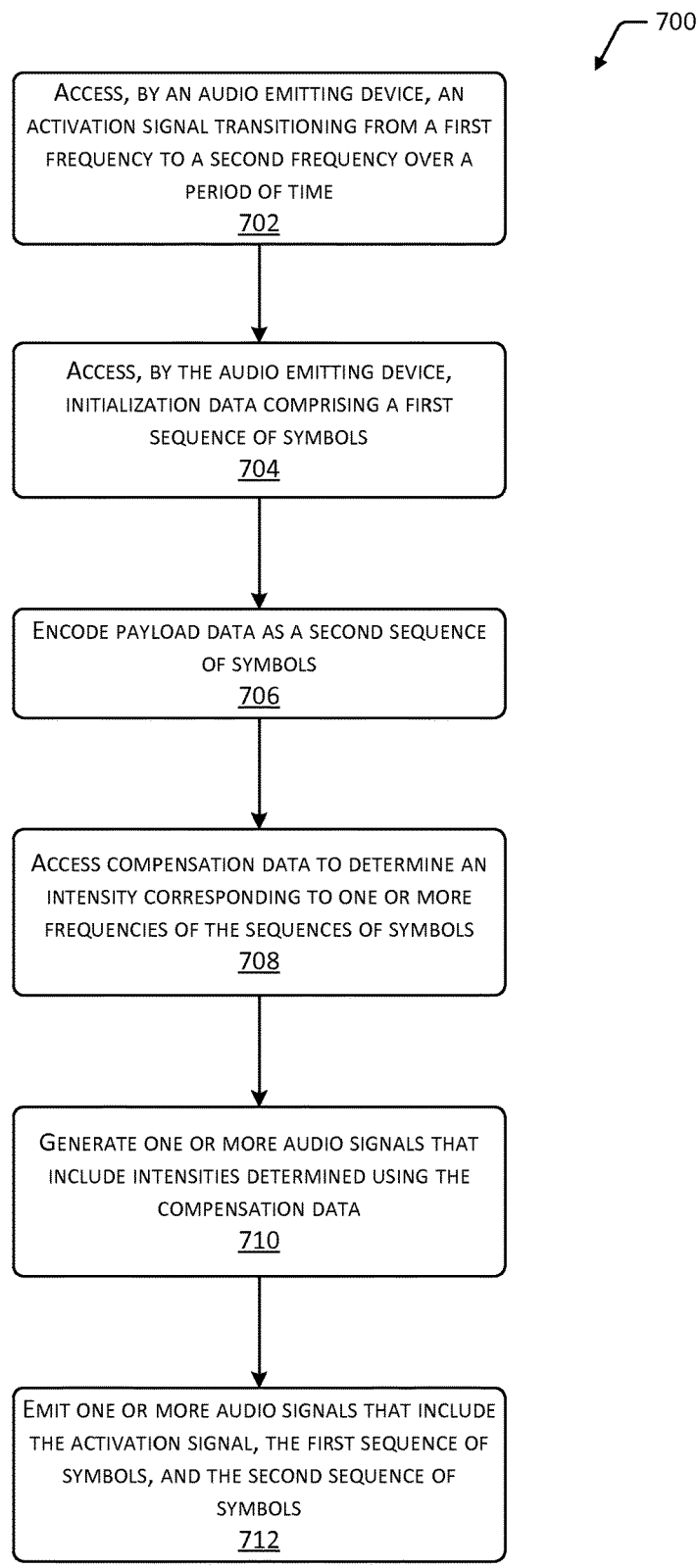
FIG. 7 is a flow diagram illustrating a process for generating an activation signal and a payload signal encoding payload data and determining correspondence between the intensity of the signal(s) and an expected threshold intensity.

FIG. 7 is a flow diagram 700 illustrating a process for generating an activation signal 112 and a payload signal 106 encoding payload data 130, and determining correspondence between the intensity of the signal(s) and an expected threshold intensity.

Block 702 accesses an activation signal 112 transitioning from a first frequency to a second frequency over a period of time. For example, a speaker 104 may emit a chirp signal or another type of activation signal 112 that transitions across a range of frequencies over a duration of time. In one implementation, the activation signal 112 may include a chirp activation signal having a duration of 4.1 ms that linearly increases from an initial frequency of 18,375 Hz to a frequency of 19,355 Hz. In other implementations, an activation signal 112 may transition from a greater frequency, such as 19,355 Hz, to a lesser frequency, such as 18,375 Hz. In still other implementations, an activation signal 112 may transition through a sequence of frequencies. For example, an activation signal 112 may transition from a first frequency to a second frequency, then to a third frequency that differs from the first and second frequencies, and to any number of additional frequencies.

Block 704 accesses initialization data 128, encoded as a predetermined sequence of symbols. For example, prior to encoding payload data 130 as a payload signal 106 and transmitting the portion of the payload signal 106 that includes the encoded payload data 130, the initialization data 128 may be emitted by an audio emitting device. The initialization data 128 may include one or more predetermined symbols, which may be emitted in a sequence unlikely to be randomly generated by noise 408. As described previously, one implementation may include initialization data 128 that includes a sequence of five symbols, "0, 1, 1, 2, 3," each having a duration of 4.1 ms. The initialization data 128 may be configured for detection by a confirmation module 136, which may determine correspondence between the initialization data 128 and confirmation data 138. For example, the confirmation data 138 may include an expected sequence of symbols that at least a portion of the initialization data 128 may match.

Block 706 encodes payload data 130 as a second sequence of symbols. The sequence of symbols encoding the payload data 130 may be decoded by an audio receiving device after correspondence between the initialization data 128 and the confirmation data 138 is determined. In some implementations, initialization data 128 may precede each packet of payload data 130. In other implementations, initialization data 128 may precede the first packet of a transmission of a group of multiple packets. In some implementations, the initialization data 128 preceding each packet or group of packets may be identical, such that the confirmation data 138 may be used to confirm that multiple payload signals 106 have not been corrupted by noise 408, equipment limitations, and so forth.

Block 708 accesses compensation data 326 to determine an intensity corresponding to one or more frequencies of the sequences of symbols. For example, an audio emitting device or audio receiving device may determine that the intensity of the activation signal 112 is greater than or less than an expected intensity at one or more frequencies. The expected intensity may be stored as activation data 120. Responsive to variances 606 between the intensity of the activation signal 112 and one or more expected intensities, the intensity of subsequent signals at one or more frequencies may be modified to compensate for the variances 606. In some implementations, the audio emitting device may modify the intensity of subsequent signals based at least partially on the compensation data 326. In other implementations, the audio receiving device may be configured to adjust a sensitivity of subsequent signals at one or more frequencies based at least in part on the compensation data 326.

Block 710 generates one or more audio signals that include intensities determined using the compensation data 326. The audio signals may include activation signals 112, equalization signals 122, or payload signals 106. For example, if it is determined that audio signals having a frequency that corresponds to a first symbol are received by a microphone 110 at an intensity less than a threshold intensity, a generated audio signal may include an increased intensity for each instance of the first symbol that is emitted.

Similarly, the intensity of a symbol may be decreased when it is determined that the intensity of a received signal exceeds a threshold intensity. For example, an equalization module 124 may be used to determine whether one or more received symbols have intensities that are equal to or exceed one or more threshold intensities, stored as equalization data 126. In other implementations, the audio receiving device may be configured to receive audio signals at modified intensities corresponding to one or more frequencies using the compensation data 326.

Block 712 emits one or more audio signals that include the activation signal 112, the first sequence of symbols encoding the initialization data 128, and the second sequence of symbols encoding the payload data 130. In some implementations, the activation signal 112 may be emitted first, and a confirmation signal from an audio receiving device may be received prior to emitting a subsequent payload signal 106 encoding the payload data 130. The activation signal 112 may cause the audio receiving device to begin actively decoding audio data. While the activation signal 112 itself may not necessarily be decoded, the activation signal 112 may include an expected frequency, range of frequencies, or sequence of frequencies that may be received by the audio receiving device, such that correspondence between the activation signal 112 and activation data 120 may be determined.

In some implementations, an audio signal encoding the initialization data 128 may be emitted prior to emission of a payload signal 106 encoding the payload data 130. A responsive confirmation signal may be received after a determination of correspondence between the initialization data 128 and confirmation data 138, after which, the payload signal 106 carrying the payload data 130 may be emitted. In other implementations, a single payload signal 106 encoding the initialization data 128 and the payload data 130 may be emitted. In still other implementations, the single payload signal 106 may also include the activation signal 112.

Figure 8:
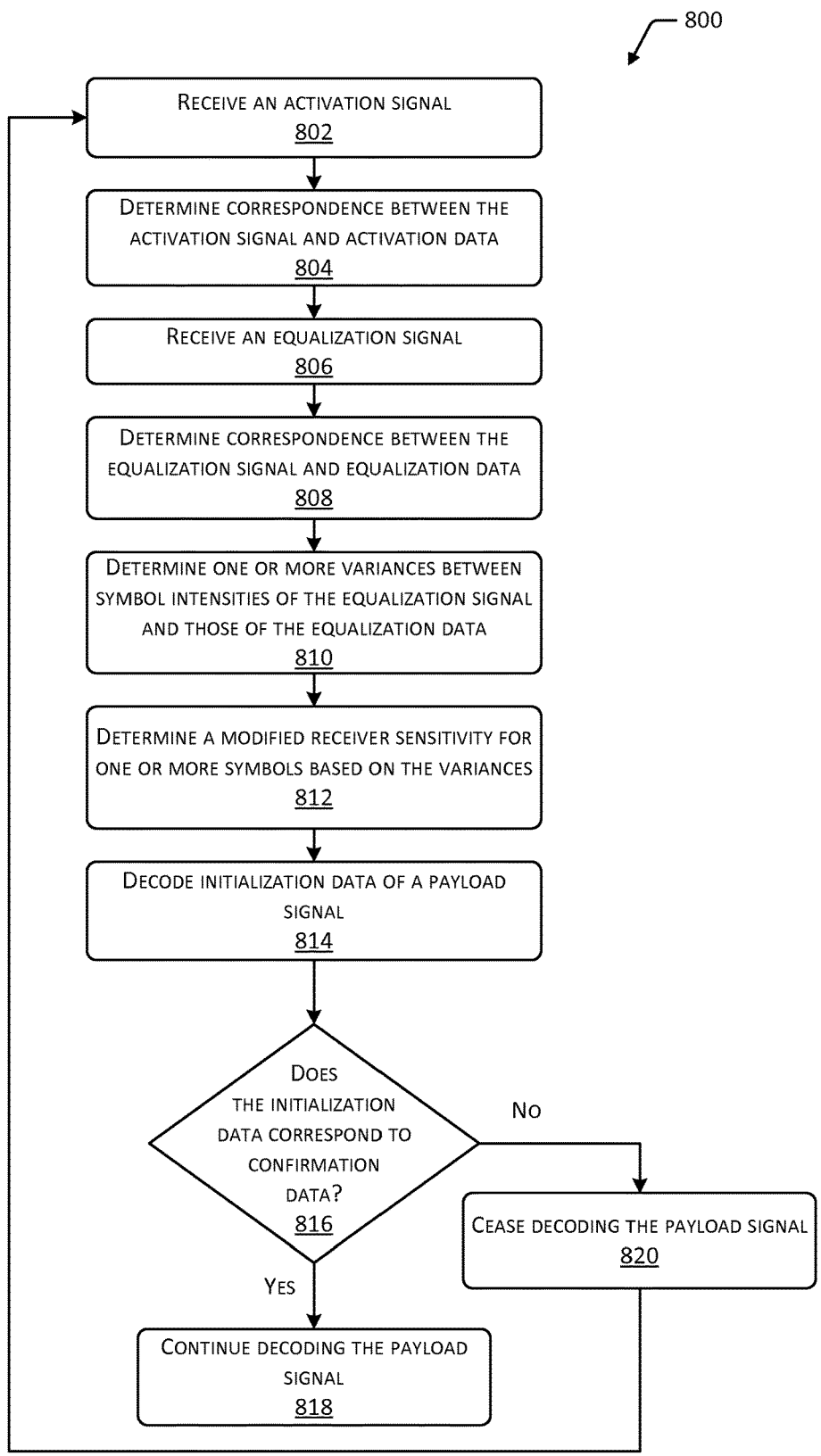
FIG. 8 is a flow diagram illustrating a process for using correspondence between an initialization data of a payload signal and confirmation data to determine whether to continue decoding the payload signal.

FIG. 8 is a flow diagram 800 illustrating a process for determining correspondence or lack thereof between confirmation data 138 and an initial portion of a payload signal 106.

Block 802 receives an activation signal 112. For example, an audio emitting device that includes a speaker 104 may emit an activation signal 112 at one or more frequencies or intensities. The activation signal 112 may further have a selected duration. An audio receiving device, which may include a microphone 110, may receive the activation signal 112.

Block 804 determines correspondence between the activation signal 112 and activation data 120. For example, an audio receiving device may have a memory 114 associated therewith, such as a CRSM or similar type of data store 322. A signal detection module 118 associated with the audio receiving device may receive the activation signal 112 and access activation data 120. The activation data 120 may include one or more signal frequencies 120(1), signal intensities 120(2), signal durations 120(3), and so forth. The signal detection module 118 may determine correspondence between one or more of the frequencies, intensities, or duration of the activation signal 112 and the activation data 120. Responsive to a determination of correspondence between the activation signal 112 and the activation data 120, the audio receiving device may begin decoding subsequent payload signals 106. Responsive to a determination of a lack of correspondence, the audio receiving device may continue attempting to detect subsequent activation signals 112.

Block 806 receives an equalization signal 122. For example, an audio emitting device may emit an equalization signal 122 that includes one or more equalization symbols. The equalization symbols may correspond to one or more of the symbols used to encode payload data 130. The equalization signal 122 may be used to verify that equipment limitations of the audio emitting device or audio receiving device, or ambient noise levels, do not prevent emission or reception of one or more of the equalization symbols. The audio receiving device may receive the emitted equalization signal 122. In some implementations, the equalization signal 122 may include at least one instance of each symbol that will be used to encode payload data 130.

Block 808 determines correspondence between the equalization signal 122 and equalization data 126 associated with the audio receiving device. For example, an equalization module 124 associated with the audio receiving device may receive the equalization signal 122 and access equalization data 126. The equalization data 126 may include one or more signal symbols 126(1) or symbol intensities 126(2) corresponding to the equalization symbols. The equalization module 124 may determine correspondence between the equalization data 126 and the received equalization symbols and the intensities thereof. Responsive to a determination of correspondence between the equalization signal 122 and the equalization data 126, the audio receiving device may begin decoding subsequent payload signals 106. Responsive to a determination of a lack of correspondence, the audio emitting device or audio receiving device may determine a variance 606 between the symbols or intensities thereof and the expected symbols or intensities indicated in the equalization data 122. A subsequent equalization signal 122 may be modified based on the variance and emitted by an audio emitting device. In other implementations, responsive to a lack of correspondence, one or more of the audio emitting device or audio receiving device may cease emitting or decoding signals, respectively.

Block 810 determines one or more variances 606 between the symbol intensities 126(2) of the equalization signal 122 and those of the equalization data 126. For example, one or more of the equalization symbols may include an intensity less than the expected symbol intensity 126(2) corresponding to the equalization symbol(s), which may hinder decoding thereof. Determined variances 606 may be stored as compensation data 326.

Block 812 determines a modified receiver sensitivity for one or more symbols based on the variances 606. For example, an audio receiving device may be configured to receive frequencies that correspond to the variances 606 at a greater or lesser intensity than that at which the frequency was emitted to compensate for the variances 606. Compensating for the presence of the variances 606 may facilitate successful receipt and decoding of each symbol used.

Block 814 decodes initialization data 128 of a payload signal 106. For example, a decoding module 132 associated with the audio receiving device may begin decoding a received payload signal 106. In some implementations, a payload signal 106 encoding initialization data 128 and payload data 130 may be emitted by a speaker 104, and the audio receiving device may receive and decode the initialization data 128 thereof. In other implementations, the audio receiving device may receive noise 408 and begin attempting to decode the noise 408. In still other implementations, the payload signal 106 emitted by the speaker 104 may be corrupted by noise 408, equipment limitations, and so forth.

Block 816 determines whether the initialization data 128 corresponds to confirmation data 138 or a lack of correspondence is determined. For example, a sequence of symbols received in initialization data 128 may be compared to an expected sequence of symbols stored as confirmation data 138 to determine correspondence or a lack thereof.

Block 818 continues decoding the payload signal 106 responsive to a determination of correspondence between the initialization data 128 and the confirmation data 138. Correspondence between the initialization data 128 and the confirmation data 138 may indicate that the payload signal 106 includes encoded payload data 130, and continued decoding thereof may enable the audio receiving device to access the payload data 130.

Block 820 ceases decoding the payload signal 106 responsive to a lack of correspondence between the initialization data 128 and the confirmation data 138. For example, an audio signal that is a product of noise 408 may be detected as a false payload signal 106. Alternatively, a payload signal 106 may be corrupted by noise 408, equipment limitations, and so forth. A flawed payload signal 106 will not correspond to the confirmation data 138. Subsequent to a lack of correspondence, the audio receiving device may return to attempting to detect subsequent activation signals 112, which may be received at block 802. Cessation of decoding prior to reaching the end of the payload signal 106 may conserve power, computing resources, time, and so forth. Furthermore, cessation of decoding prior to reaching the end of the payload signal 106 may minimize the likelihood that subsequent signals will be undetected while the audio receiving device decodes flawed audio signals.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a microphone;
   at least one non-transitory computer-readable storage medium storing computer-executable instructions; and
   at least one hardware processor configured to execute the computer-executable instructions to:
   access activation data stored in the computer-readable storage medium, wherein the activation data comprises a range of frequencies and a threshold value indicative of one or more of a threshold power or a threshold amplitude;
   receive a chirp audio signal using the microphone, wherein the chirp audio signal comprises one or more of an amplitude or a power corresponding to the threshold value, and wherein the chirp audio signal transitions from a first frequency to a second frequency over a period of time;
   determine correspondence between the range of frequencies of the activation data and the chirp audio signal;
   receive a second audio signal using the microphone;
   decode the second audio signal based at least in part on the correspondence between the range of frequencies of the activation data and the chirp audio signal;
   determine a first sequence of symbols;
   access confirmation data in the computer-readable storage medium, wherein the confirmation data corresponds to a second sequence of symbols;
   determine a mismatch between the first sequence of symbols and the second sequence of symbols;
   cease decoding audio data based at least in part on the mismatch between the first sequence of symbols and the second sequence of symbols;
   receive an additional chirp audio signal using the microphone, wherein the additional chirp audio signal comprises one or more of a second amplitude or a second power corresponding to the threshold value, and wherein the additional chirp audio signal transitions from the first frequency to the second frequency;
   determine correspondence between the range of frequencies of the activation data and the additional chirp audio signal;
   receive a third audio signal using the microphone;

decode the third audio signal based at least in part on the correspondence between the range of frequencies of the activation data and the additional chirp audio signal;
determine a third sequence of symbols;
determine a match between the third sequence of symbols and the second sequence of symbols; and
continue decoding audio data based at least in part on the match between the third sequence of symbols and the second sequence of symbols.

2. The system of claim 1, further comprising computer-executable instructions to:
receive an equalization signal; and
determine a plurality of equalization symbols from the equalization signal, wherein an equalization symbol of the plurality of equalization symbols has one or more frequencies corresponding to at least one symbol of the first sequence of symbols or of the second sequence of symbols.

3. The system of claim 1, further comprising computer-executable instructions to:
determine a variance between the one or more of the amplitude or the power of the chirp audio signal and the threshold value for at least one frequency; and
modify a sensitivity of the microphone for the at least one frequency based at least in part on the variance.

4. A method comprising:
receiving audio data comprising initialization data and payload data;
decoding a portion of the audio data, wherein the portion includes the initialization data and excludes the payload data;
determining a first sequence of symbols based at least in part on the initialization data;
accessing confirmation data corresponding to a second sequence of symbols;
determining a mismatch between the first sequence of symbols and the second sequence of symbols;
responsive to the mismatch, ceasing decoding of the audio data;
receiving second audio data comprising second initialization data and second payload data;
determining a third sequence of symbols based at least in part on the second initialization data;
determining correspondence between the third sequence of symbols and the second sequence of symbols; and
decoding at least a portion of the payload data based at least in part on the correspondence between the third sequence of symbols and the second sequence of symbols.

5. The method of claim 4, further comprising:
receiving an activation signal separate from the audio data; and
based at least in part on the activation signal, decoding at least a portion of the initialization data to determine the first sequence of symbols.

6. The method of claim 4, further comprising:
determining correspondence between frequencies of the initialization data and one or more threshold frequencies;
wherein the decoding of the portion of the audio data to determine the first sequence of symbols is further based at least in part on the correspondence between the frequencies of the initialization data and the one or more threshold frequencies.

7. The method of claim 4, further comprising:
determining one or more of an amplitude or a power of at least a portion of the first sequence of symbols;
determining correspondence between the one or more of the amplitude or the power of the at least a portion of the first sequence of symbols and a threshold value; and
beginning decoding of at least a portion of the initialization data to determine the first sequence of symbols.

8. The method of claim 4, further comprising:
determining a variance between at least a portion of the audio data and a threshold value for at least one frequency; and
modifying a sensitivity at which the audio data is received based at least in part on the variance.

9. A system comprising:
at least one non-transitory computer-readable storage medium storing computer-executable instructions; and
at least one hardware processor configured to execute the computer-executable instructions to:
receive audio data comprising initialization data and payload data;
decode a portion of the audio data, wherein the portion of the audio data includes the initialization data;
determine a first sequence of symbols based at least in part on the initialization data;
access confirmation data corresponding to a second sequence of symbols;
determine a mismatch between the first sequence of symbols and the second sequence of symbols;
responsive to the mismatch, cease decoding of the portion of the audio data;
receive second audio data comprising second initialization data and second payload data;
determine a third sequence of symbols based at least in part on the second initialization data;
determine correspondence between the third sequence of symbols and the second sequence of symbols; and
decode at least a portion of the payload data based at least in part on the correspondence between the third sequence of symbols and the second sequence of symbols.

10. The system of claim 9, wherein the computer-executable instructions to decode the portion of the audio data comprise computer-executable instructions to:
determine an error handling scheme within the payload data; and
determine correspondence between the error handling scheme and an expected result to verify integrity of the payload data.

11. The system of claim 9, further comprising computer-executable instructions to:
receive an activation signal separate from the audio data; and
based at least in part on the activation signal, decode at least a portion of the initialization data to determine the first sequence of symbols.

12. The system of claim 9, further comprising computer-executable instructions to:
determine a relationship between one or more of an amplitude or a power of the initialization data and one or more of a threshold amplitude or a threshold power;
wherein the decoding of the portion of the audio data to determine the first sequence of symbols is further based at least in part on the relationship.

13. The system of claim 9, further comprising computer-executable instructions to:
determine one or more of an amplitude or a power of at least a portion of the first sequence of symbols;

access equalization data comprising one or more of a threshold amplitude or a threshold power for the at least a portion of the first sequence of symbols;

determine a relationship between the at least a portion of the first sequence of symbols and the one or more of the threshold amplitude or the threshold power; and begin decoding of at least a portion of the initialization data to determine the first sequence of symbols based at least in part on the relationship.

14. The system of claim 9, further comprising computer-executable instructions to:

determine a variance between one or more of an amplitude or a power of the portion of the audio data and one or more of a threshold amplitude or a threshold power for at least one frequency; and modify a sensitivity at which the audio data is received based at least in part on the variance.

15. The system of claim 9, wherein the second sequence of symbols comprises at least two symbols including a first symbol represented by a first signal having a first frequency of at least 18,000 Hz and a second symbol represented by a second signal having a second frequency of at least 18,000 Hz, the second frequency being different than the first frequency.

16. The system of claim 9, wherein at least one symbol of the second sequence of symbols comprises a duration ranging from about 1.36 milliseconds to about 20.4 milliseconds.

17. The method of claim 4, wherein the second sequence of symbols comprises at least two symbols including a first symbol represented by a first signal having a first frequency of at least 18,000 Hz and a second symbol represented by a second signal having a second frequency of at least 18,000 Hz, the second frequency being different than the first frequency.

18. The method of claim 4, further comprising:

determining a relationship between the initialization data and one or more of a threshold amplitude or a threshold power, wherein the portion of the audio data is decoded in response to the relationship.

19. The method of claim 5, wherein the activation signal includes a chirp audio signal that comprises one or more of an amplitude or a power corresponding to the threshold value, and wherein the chirp audio signal transitions from a first frequency to a second frequency over a period of time.

20. The system of claim 11, wherein the activation signal includes a chirp audio signal that transitions from a first frequency to a second frequency over a period of time, and wherein the activation signal includes at least one frequency of the one or more threshold frequencies when transitioning from the first frequency to the second frequency.

* * * * *